US012766960B2

(12) United States Patent
Kume et al.

(10) Patent No.: US 12,766,960 B2
(45) Date of Patent: Oct. 20, 2026

(54) VEHICLE DISPLAY CONTROL DEVICE, VEHICLE DISPLAY CONTROL METHOD AND NON-TRANSITORY COMPUTER READABLE MEDIUM STORING VEHICLE DISPLAY CONTROL PROGRAM

(71) Applicant: DENSO CORPORATION, Kariya-city (JP)

(72) Inventors: Takuya Kume, Kariya-city (JP); Kazuki Izumi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 130 days.

(21) Appl. No.: 18/800,914

(22) Filed: Aug. 12, 2024

(65) Prior Publication Data

US 2024/0399870 A1 Dec. 5, 2024

Related U.S. Application Data

(63) Continuation of application No. PCT/JP2023/000650, filed on Jan. 12, 2023.

(30) Foreign Application Priority Data

Feb. 21, 2022 (JP) ................................ 2022-025070
Dec. 26, 2022 (JP) ................................ 2022-208912

(51) Int. Cl.
*B60K 35/29* (2024.01)
*B60K 35/10* (2024.01)
(Continued)

(52) U.S. Cl.
CPC .............. *B60K 35/29* (2024.01); *B60K 35/10* (2024.01); *B60K 35/22* (2024.01); *B60K 35/50* (2024.01);
(Continued)

(58) Field of Classification Search
CPC ........ B60K 35/29; B60K 35/81; B60K 35/50; B60K 35/10; B60K 35/60; B60K 35/60;
(Continued)

(56) References Cited

U.S. PATENT DOCUMENTS 11,555,711 B2 * 1/2023 Chandupatla ........ G01C 21/367
2017/0315771 A1 * 11/2017 Kerr ....................... H04N 7/181
(Continued)

FOREIGN PATENT DOCUMENTS

JP 2005324661 A 11/2005
JP 2017107502 A 6/2017
(Continued)

*Primary Examiner* — Justin S Lee
(74) *Attorney, Agent, or Firm* — Harness, Dickey & Pierce P.L.C.

(57) ABSTRACT

Disclosed is a technique of controlling display of travel related information on an indicator provided in a vehicle that can be switched between non-monitoring-obligation automated driving and monitoring-obligation driving. The non-monitoring-obligation automated driving is automated driving without a surrounding monitoring obligation. The monitoring-obligation driving is driving with the surrounding monitoring obligation. In the method, the travel related information displayed during the non-monitoring-obligation automated driving is reduced compared to the travel related information displayed during the monitoring-obligation driving. Reduction of the travel related information is suppressed based on an identified vehicle situation during the non-monitoring-obligation automated driving.

22 Claims, 12 Drawing Sheets

(51) Int. Cl.

| | |
|---|---|
| ***B60K 35/22*** | (2024.01) |
| ***B60K 35/50*** | (2024.01) |
| ***B60K 35/60*** | (2024.01) |
| ***B60K 35/65*** | (2024.01) |
| ***B60K 35/81*** | (2024.01) |
| ***B60K 35/90*** | (2024.01) |
| *B60K 35/26* | (2024.01) |
| *B60K 35/28* | (2024.01) |

(52) U.S. Cl.
CPC ............ *B60K 35/60* (2024.01); *B60K 35/654* (2024.01); *B60K 35/81* (2024.01); *B60K 35/90* (2024.01); *B60K 35/26* (2024.01); *B60K 35/28* (2024.01); *B60K 2360/167* (2024.01); *B60K 2360/175* (2024.01); *B60K 2360/1876* (2024.01); *B60K 2360/195* (2024.01); *B60K 2360/48* (2024.01)

(58) Field of Classification Search
CPC ...... B60K 35/22; B60K 35/90; B60K 35/654; B60K 35/26; B60K 35/28
See application file for complete search history.

(56) References Cited

U.S. PATENT DOCUMENTS

| | | | | |
|---|---|---|---|---|
| 2018/0099676 | A1* | 4/2018 | Goto | B60W 30/10 |
| 2019/0111943 | A1* | 4/2019 | Suzuki | B60W 50/14 |
| 2020/0148205 | A1 | 5/2020 | Yoshida et al. | |
| 2020/0172123 | A1* | 6/2020 | Kubota | B60W 60/0053 |
| 2020/0377126 | A1* | 12/2020 | Obata | B60K 35/80 |
| 2022/0009355 | A1* | 1/2022 | Kim | B60L 53/66 |
| 2022/0204042 | A1* | 6/2022 | MacKenzie | B60W 60/0051 |

FOREIGN PATENT DOCUMENTS

| | | | | |
|---|---|---|---|---|
| JP | 2017222271 | A | 12/2017 | |
| JP | 2022031101 | A | 2/2022 | |
| KR | 20220010655 | A * | 1/2022 | B60K 35/81 |
| WO | WO-2018066028 | A1 * | 4/2018 | G01C 21/36 |
| WO | WO-2019043847 | A1 | 3/2019 | |

* cited by examiner

| | REGENERATION RELATED INFORMATION | ROTATION SPEED INFORMATION |
|---|---|---|
| STRONG REGENERATION MODE | LARGE | SMALL |
| WEAK REGENERATION MODE | MEDIUM | MEDIUM |
| NON-REGENERATION MODE | SMALL | LARGE |

| | OCCUPANT | REMOTE OPERATOR |
|---|---|---|
| DURING REMOTE OPERATION | REDUCED | NOT REDUCED |
| AT TIME OF DRIVING-MODE SWITCHING | NOT REDUCED | NOT REDUCED |

VEHICLE DISPLAY CONTROL DEVICE, VEHICLE DISPLAY CONTROL METHOD AND NON-TRANSITORY COMPUTER READABLE MEDIUM STORING VEHICLE DISPLAY CONTROL PROGRAM

CROSS REFERENCE TO RELATED APPLICATIONS

The present application is a continuation application of International Patent Application No. PCT/JP2023/000650 filed on Jan. 12, 2023, which designated the U.S. and claims the benefit of priority from Japanese Patent Application No. 2022-025070 filed on Feb. 21, 2022, and Japanese Patent Application No. 2022-208912 filed on Dec. 26, 2022. The disclosures of all the above applications are incorporated herein.

TECHNICAL FIELD

The present disclosure relates to a vehicle display control device and a vehicle display control method.

BACKGROUND

There is a technique for performing high-level automated driving in which a driver is not required to monitor the surroundings.

SUMMARY

According to at least one embodiment of the present disclosure, a technique is used for a vehicle configured to be switched between non-monitoring-obligation automated driving that is automated driving without a surrounding monitoring obligation and monitoring-obligation driving that is driving with the surrounding monitoring obligation. In the technique, a situation of the vehicle is identified, and display of travel related information on an indicator provided in a vehicle compartment of the vehicle is controlled. The travel related information is information related to traveling of the vehicle. In the controlling of the display, the travel related information to be displayed on the indicator during the non-monitoring-obligation automated driving is reduced compared to the travel related information displayed during the monitoring-obligation driving. In the controlling of the display, reduction of the travel related information is suppressed based on a vehicle situation identified in the identifying during the non-monitoring-obligation automated driving. The vehicle situation excludes information about whether the vehicle is operated in the non-monitoring-obligation automated driving.

BRIEF DESCRIPTION OF THE DRAWINGS

The details of one or more embodiments are set forth in the accompanying drawings and the description below. Other features and advantages will be apparent from the description and drawings, and from the claims.

DETAILED DESCRIPTION

Figure 1:
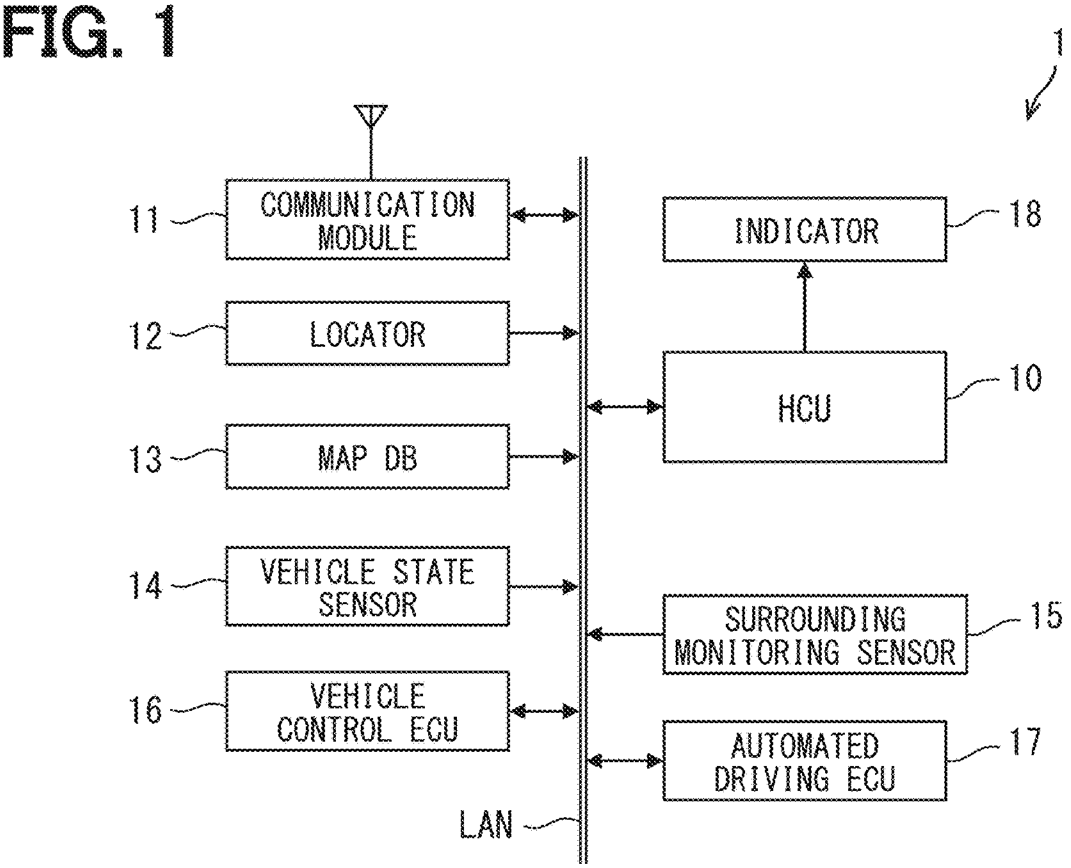
FIG. 1 is a diagram illustrating an example of a schematic configuration of a vehicle system.

To begin with, examples of relevant techniques will be described. According to a comparative example, high-level automated driving of a vehicle is executed, in which a driver is not required to monitor the surroundings.

In the automated driving (hereinafter, referred to as non-monitoring-obligation automated driving) in which a surrounding monitoring obligation is not required, the driver is not required to monitor the surroundings. Therefore, it is conceivable to reduce the amount of information (hereinafter, referred to as travel related information) related to traveling of the vehicle displayed on the indicator, compared with driving in which the surrounding monitoring obligation is required. However, depending on the type of travel related information to be reduced, the information for the driver to enjoy traveling on the vehicle may be reduced, and the convenience for the driver may be deteriorated.

In contrast, according to the present disclosure, deterioration in convenience for a driver can be suppressed even in a case where an amount of display of information related to traveling is reduced during non-monitoring-obligation automated driving.

According to an aspect of the present disclosure, a vehicle display control device can is used for a vehicle configured to be switched between non-monitoring-obligation automated driving that is automated driving without a surrounding monitoring obligation and monitoring-obligation driving that is driving with the surrounding monitoring obligation. The vehicle display control device includes a situation identification unit configured to identify a situation of the vehicle, and a display control unit configured to control display of travel related information on an indicator provided in a vehicle compartment of the vehicle. The travel related information is information related to traveling of the vehicle. The display control unit is configured to reduce the travel related information to be displayed on the indicator during the non-monitoring-obligation automated driving compared to the travel related information displayed during the monitoring-obligation driving. The display control unit is configured to suppress reduction of the travel related information based on a vehicle situation identified by the situation identification unit during the non-monitoring-obligation automated driving. The vehicle situation excludes information about whether the vehicle is operated in the non-monitoring-obligation automated driving.

According to another aspect of the present disclosure, a vehicle display control method is used for a vehicle configured to be switched between non-monitoring-obligation automated driving that is automated driving without a surrounding monitoring obligation and monitoring-obligation driving that is driving with the surrounding monitoring obligation. The method is executed by at least one processor. In the method, a situation of the vehicle is identified, and display of travel related information on an indicator provided in a vehicle compartment of the vehicle is controlled. The travel related information is information related to traveling of the vehicle. In the controlling, the travel related information to be displayed on the indicator during the non-monitoring-obligation automated driving is reduced compared to the travel related information displayed during the monitoring-obligation driving. In the controlling, reduction of the travel related information is suppressed based on a vehicle situation identified in the identifying during the non-monitoring-obligation automated driving. The vehicle situation excludes information about whether the vehicle is operated in the non-monitoring-obligation automated driving.

According to the above configuration, the travel related information to be displayed on the indicator is reduced during the non-monitoring-obligation automated driving, compared with the monitoring-obligation driving. Therefore, The amount of displayed information related to traveling can be reduced during non-monitoring-obligation automated driving. In addition, even during non-monitoring-obligation automated driving, reduction of the travel related information is suppressed according to the situation of the vehicle other than a situation indicating whether the vehicle is being operated in the non-monitoring-obligation automated driving. Therefore, in a situation of the vehicle in which convenience for the driver is deteriorated when the travel related information is reduced, reduction of the travel related information can be suppressed. As a result, even in a case where the amount of displayed information related to traveling is reduced during the non-monitoring-obligation automated driving, it is possible to suppress deterioration of convenience for the driver.

Hereinafter, embodiments of the present disclosure will be described with reference to the drawings. For convenience of description, portions having the same functions as those illustrated in the drawings used for the description so far are denoted by the same reference numerals among the plurality of embodiments, and the description thereof may be omitted. For portions denoted by the same reference numerals, descriptions in other embodiments can be referred to.

First Embodiment

Hereinafter, first embodiment of the present disclosure will be described with reference to the drawings. A vehicle system 1 illustrated in FIG. 1 can be used in a vehicle capable of performing automated driving (hereinafter, automated driving vehicle). As illustrated in FIG. 1, the vehicle system 1 includes a human machine interface control unit (HCU) 10, a communication module 11, a locator 12, a map database (hereinafter, map DB) 13, a vehicle state sensor 14, a surrounding monitoring sensor 15, a vehicle control ECU 16, an automated driving ECU 17, and an indicator 18. For example, the HCU 10, the communication module 11, the locator 12, the map DB 13, the vehicle state sensor 14, the surrounding monitoring sensor 15, the vehicle control ECU 16, and the automated driving ECU 17 may be configured to be connected to an in-vehicle LAN (see the LAN in FIG. 1). Although the vehicle using the vehicle system 1 is not necessarily limited to an automobile, a case where the vehicle is used for an automobile will be described below as an example.

As the degree of automated driving (automation level) of the automated driving vehicle, for example, as defined by SAE, there may be a plurality of levels. The automation level is classified into LV0 to 5 as follows, for example.

LV0 is a level at which the driver performs all driving tasks without system intervention. The driving task may be referred to as a dynamic driving task. The driving tasks are, for example, steering, acceleration/deceleration, and surrounding monitoring. LV0 corresponds to so-called manual driving. LV1 is a level at which the system assists either steering or acceleration/deceleration. LV1 corresponds to so-called driving assistance. LV2 is a level at which the system assists both steering and acceleration/deceleration. LV2 corresponds to so-called partial driving automation. It is assumed that LV1 to 2 is part of the automated driving.

For example, the automated driving of LV1 to 2 is assumed to be automated driving in which the driver has the monitoring obligation (hereinafter, simply monitoring obligation) related to safe driving. As the monitoring obligation, there is visual surrounding monitoring. The automated driving of LV1 to 2 can be referred to as automated driving in which the second task is not permitted. The second task is an action other than driving permitted to the driver, and is a specific action defined in advance. The second task can be referred to as a secondary activity, another activity, or the like. The second task should not prevent the driver from responding to the driving operation takeover request from the automated driving system. As an example, actions such as viewing content such as a moving image, operating a smartphone or the like, reading, and eating are assumed as the second task.

The automated driving of LV3 is a level at which the system can perform all driving tasks under a specific condition and the driver performs a driving operation in an emergency. In the LV3 automated driving, in a case where there is a request for a driving-mode switching from the system, the driver is required to be able to respond quickly. This driving-mode switching can be referred to as transfer of the surrounding monitoring obligation from the vehicle system to the driver. LV3 corresponds to so-called conditional driving automation. As LV3, there is area-limited LV3 limited to a specific area. The specific area referred to herein may be an expressway. The specific area may be, for example, a specific lane. As LV3, there is traffic congestion limited LV3 limited to traffic congestion. The traffic congestion limited LV3 may be configured to be limited to, for example, traffic congestion on an expressway. The expressway may include an automobile exclusive road.

The LV4 automated driving is a level at which the system can perform all driving tasks except under specific situations such as unsupportable roads and extreme environments. LV4 corresponds to so-called advanced driving automation. The LV5 automated driving is a level at which the system can perform all driving tasks under any environment. LV5 corresponds to so-called full driving automation. The automated driving of LV4 and LV5 may be performed, for example, in a travel section in which highly accurate map data is prepared. The highly accurate map data will be described later.

For example, the automated driving of LV3 to 5 is the automated driving in which the driver does not have the surrounding monitoring obligation. That is, it corresponds to non-monitoring-obligation automated driving. The automated driving of LV3 to 5 can be referred to as automated driving in which a second task is permitted. Among the automated driving of LV3 to 5, the automated driving of LV4 or higher corresponds to the automated driving in which the driver is permitted to sleep. That is, it corresponds to sleep permitted automated driving. The automated driving at LV4 or higher can be referred to as automated driving that does not require a driving-mode switching to the driver even in an emergency. Among the automated driving of LV3 to 5, the automated driving of level 3 corresponds to the automated driving in which the driver is not permitted to sleep. The driving of LV0 to LV3 corresponds to driving in which the driver is not permitted to sleep (hereinafter, sleep non-permitted driving). It is assumed that the automated driving vehicle of the present embodiment can switch the automation level. The automation level may be configured to be switchable only between some levels of LV0 to 5. It is assumed that the automated driving vehicle of the present embodiment can perform at least non-monitoring-obligation automated driving.

A communication module 11 transmits and receives information to and from a center outside the host vehicle via wireless communication. That is, wide-area communication is performed. The communication module 11 receives congestion information and the like from the center by wide-area communication. The communication module 11 may transmit and receive information to and from another vehicle via wireless communication. That is, inter-vehicle communication may be performed. The communication module 11 may transmit and receive information to and from a roadside device installed on a roadside via wireless communication. That is, road-to-vehicle communication may be performed. In a case where road-to-vehicle communication is performed, the communication module 11 may receive, via a roadside device, information about surrounding vehicles of the host vehicle transmitted from the surrounding vehicles. Furthermore, the communication module 11 may receive, via the center, information about surrounding vehicles of the host vehicle transmitted from the surrounding vehicles via wide-area communication.

The locator 12 includes a global navigation satellite system (GNSS) receiver and an inertial sensor. The GNSS receiver receives positioning signals from a plurality of positioning satellites. The inertial sensor includes, for example, a gyro sensor and an acceleration sensor. The locator 12 sequentially measures a vehicle position (hereinafter, host vehicle position) of the host vehicle on which the locator 12 is mounted by combining a positioning signal received by the GNSS receiver and a measurement result by the inertial sensor. The host vehicle position may be represented by, for example, coordinates of latitude and longitude. A travel distance obtained from a signal sequentially output from a vehicle speed sensor to be described later may also be used for positioning the host vehicle position.

The map DB 13 is a nonvolatile memory and stores highly accurate map data. The highly accurate map data is map data with higher precision than map data used for route guidance in the navigation function. The map DB 13 may also store map data used for route guidance. The highly accurate map data includes information available for automated driving, such as three-dimensional shape information about a road, number-of-lanes information, and information indicating a traveling direction allowed for each lane. In addition, the highly accurate map data may include, for example, information about node points indicating the positions of both ends for road surface marks such as section lines. The locator 12 may be configured not to use the GNSS receiver by using the three-dimensional shape information about the road. For example, the locator 12 may be configured to identify the host vehicle position by using three-dimensional shape information about the road and a detection result obtained by a light detection and ranging/laser imaging detection and ranging (LIDAR) that detects a point group of feature points of the road shape and the structure or the surrounding monitoring sensor 15 such as a surrounding monitoring camera. The three-dimensional shape information about the road may be generated based on the captured image by road experience management (REM).

The map data distributed from the external server may be received by wide-area communication via the communication module 11 and stored in the map DB 13. In this case, the map DB 13 may be a volatile memory, and the communication module 11 may sequentially acquire map data of a region corresponding to the host vehicle position.

The vehicle state sensor 14 is a sensor group for detecting various states of the host vehicle. Examples of the vehicle state sensor 14 include a vehicle speed sensor, a grip sensor, and an accelerator sensor. The vehicle speed sensor outputs a vehicle speed pulse. The grip sensor detects whether the driver grips the steering wheel. The steering wheel can be referred to as a handle. Hereinafter, the steering wheel is referred to as a handle. The accelerator sensor detects whether the accelerator pedal is depressed. An accelerator pedal force sensor that detects a pedal force applied to an accelerator pedal may be used as the accelerator sensor. As the accelerator sensor, an accelerator stroke sensor that detects a depression amount of an accelerator pedal may be used. As the accelerator sensor, an accelerator switch that outputs a signal corresponding to the presence or absence of the depression operation of the accelerator pedal may be used. The vehicle state sensor 14 outputs the detected sensing information to the in-vehicle LAN. The sensing information detected by the vehicle state sensor 14 may be output to the in-vehicle LAN via an ECU mounted on the host vehicle.

The surrounding monitoring sensor 15 monitors a surrounding environment of the host vehicle. As an example, the surrounding monitoring sensor 15 detects obstacles around the host vehicle such as moving objects such as pedestrians and other vehicles, and stationary objects such as falling objects on the road. In addition, the sensor detects road surface marks such as traveling section lines around the host vehicle. The surrounding monitoring sensor 15 is, for example, a surrounding monitoring camera that captures an image of a predetermined range around the host vehicle, or a sensor such as a millimeter wave radar, sonar, or LIDAR that transmits a probing wave to the predetermined range around the host vehicle. The surrounding monitoring camera sequentially outputs captured images sequentially captured as sensing information to the automated driving ECU 17. A sensor that transmits a probing wave such as a sonar, a millimeter wave radar, or a LIDAR sequentially outputs a scanning result based on a reception signal obtained in a case where a reflected wave reflected by an obstacle is received to the automated driving ECU 17 as sensing information. The sensing information detected by the surrounding monitoring sensor 15 may be output to the automated driving ECU 17 without passing through the in-vehicle LAN.

The vehicle control ECU 16 is an electronic control device that performs travel control of the host vehicle. Examples of the travel control include acceleration/deceleration control and/or steering control. Examples of the vehicle control ECU 16 include a steering ECU that performs steering control, a power unit control ECU that performs acceleration/deceleration control, and a brake ECU. The vehicle control ECU 16 performs travel control by outputting a control signal to each travel control device such as an electronically controlled throttle, a brake actuator, and an electric power steering (EPS) motor mounted on the host vehicle.

The automated driving ECU 17 includes, for example, a processor, a memory, an I/O, and a bus connecting these components, and executes a control program stored in the memory to execute processing related to automated driving. The memory referred to herein is a non-transitory tangible storage medium that non-transiently stores computer-readable programs and data. In addition, the non-transitory tangible storage medium is realized by a semiconductor memory, a magnetic disk, or the like. The automated driving ECU 17 includes a travel environment recognition unit, an action determination unit, and a control execution unit as functional blocks.

The travel environment recognition unit recognizes the travel environment of the host vehicle from the host vehicle position acquired from the locator 12, the map data acquired from the map DB 13, and the sensing information acquired from the surrounding monitoring sensor 15. As an example, the travel environment recognition unit recognizes the position, the shape, and the movement state of the object around the host vehicle using these pieces of information, and generates a virtual space in which the actual travel environment is reproduced. The travel environment recognition unit may recognize the host vehicle position on the map from the host vehicle position and the map data. In a case where the travel environment recognition unit can acquire position information, speed information, and the like of surrounding vehicles and the like via the communication module 11, the travel environment recognition unit may also recognize the travel environment using these pieces of information.

The travel environment recognition unit may also determine a manual driving area (hereinafter, MD area) in the travel area of the host vehicle. The travel environment recognition unit may also determine an automated driving area (hereinafter, the AD area) in the travel area of the host vehicle. The travel environment recognition unit may also determine ST sections and non-ST sections described later in the AD area.

The MD area is an area where automated driving is prohibited. In other words, the MD area is an area defined such that the driver executes all of the longitudinal direction control, the lateral direction control, and the surrounding monitoring of the host vehicle. The longitudinal direction is a direction that coincides with the front-rear direction of the host vehicle. The lateral direction is a direction coinciding with the width direction of the host vehicle. The longitudinal direction control corresponds to acceleration/deceleration control of the host vehicle. The lateral direction control corresponds to steering control of the host vehicle. For example, the MD area may be a general road. The MD area may be a travel section of a general road on which highly accurate map data is not prepared.

The AD area is an area where automated driving is permitted. In other words, the AD area is an area defined such that the host vehicle can handle instead one or more of the longitudinal direction control, the lateral direction control, and the surrounding monitoring. For example, the AD area may be an expressway. The AD area may be a travel section in which highly accurate map data is prepared. For example, the automated driving (hereinafter, area-limited automated driving) of the area-limited LV3 may be permitted only on an expressway. The automated driving (hereinafter, traffic congestion limited automated driving) of the traffic congestion limited LV3 may be permitted only at the time of traffic congestion in the AD area.

The AD area is divided into an ST section and a non-ST section. The ST section is a section in which area-limited automated driving is permitted. The non-ST section is a section in which automated driving of LV2 or less and traffic congestion limited automated driving are possible. In the present embodiment, the non-ST section in which the automated driving of LV1 is permitted and the non-ST section in which the automated driving of LV2 is permitted are not distinguished. The non-ST section may be a section that does not correspond to the ST section of the AD area.

The action determination unit switches a control subject of the driving operation between the driver and the system of the host vehicle. In a case where the control right of the driving operation is on the system side, the action determination unit determines a travel plan for causing the host vehicle to travel based on the recognition result of the travel environment by the travel environment recognition unit. As the travel plan, a route to a destination and a behavior to be taken by the host vehicle to arrive at the destination may be determined. Examples of behavior include straight traveling, right turning, left turning, lane change, and the like.

In addition, the action determination unit switches the automation level of the automated driving of the host vehicle as necessary. The action determination unit determines whether the automation level can be increased. For example, in a case where the host vehicle moves from the MD area to the non-ST section in the AD area, it may be determined that the manual driving of LV0 can be switched to the automated driving of LV2 or less. In a case where the host vehicle moves from the MD area to the ST section in the AD area, it may be determined that the manual driving of LV0 can be switched to the area-limited automated driving. In a case where the host vehicle moves from the non-ST section to the ST section in the AD area, it may be determined that the automated driving of LV2 or less can be switched to the automated driving of LV3. In a case where all the conditions of the traffic congestion limited LV3 are satisfied in a state where the host vehicle is located in the AD area and the automation level is LV2 or less, it may be determined that the automated driving of LV2 or less can be switched to the traffic congestion limited automated driving. In addition, in a case where the start condition of LV4 is satisfied, it may be determined that switching from LV3 or less to LV4 is possible. The action determination unit may increase the automation level in a case where it is determined that the automation level can be increased and in a case where the driver approves the increase in the automation level.

The action determination unit may lower the automation level in a case where it is determined that it is necessary to lower the automation level. Examples of the case where it is determined that it is necessary to lower the automation level include the time of override detection, the time of planned driving-mode switching, and the time of unplanned driving-mode switching. The override is an operation for a driver of the host vehicle to voluntarily acquire a control right of the host vehicle. In other words, the override is an operational intervention by the driver of the vehicle. The planned driving-mode switching is a scheduled driving-mode switching determined by the system. The unplanned driving-mode switching is an unscheduled sudden driving-mode switching determined by the system.

In a case where the control right of the driving operation is on the system side of the host vehicle, the control execution unit executes acceleration/deceleration control, steering control, and the like of the host vehicle according to the travel plan determined by the action determination unit in cooperation with the vehicle control ECU 16. The control execution unit executes, for example, adaptive cruise control (ACC) control, lane tracing assist (LTA) control, and lane change assist (LCA) control.

The ACC control is control for realizing constant speed traveling of the host vehicle at a set vehicle speed or following traveling to a preceding vehicle. In the following traveling, acceleration/deceleration control is performed so as to maintain an inter-vehicle distance between the host vehicle and the nearest preceding vehicle at a target inter-vehicle distance. The target inter-vehicle distance may be set according to the speed of the host vehicle. The LTA control is control for maintaining in-lane travel of the host vehicle. In the LTA control, steering control is performed such that the host vehicle maintains in-lane travel. The LCA control is control for automatically changing the lane of the host vehicle from the host vehicle lane to the adjacent lane. In the LCA control, a lane is changed by performing acceleration/deceleration control and steering control.

The indicator 18 displays information to present information. The indicator 18 is provided in the interior of the host vehicle. The indicator 18 presents information to at least the driver of the host vehicle. The indicator 18 displays information according to an indication of the HCU 10.

The indicator 18 can include, for example, a meter multi information display (MID), a center information display (CID), a head-up display (HUD), or the like. The meter MID is a display device provided in front of the driver seat in the vehicle compartment. As an example, the meter MID may be provided on a meter panel. The CID is a display device disposed at the center of an instrument panel of the host vehicle. The HUD is provided on, for example, an instrument panel in the vehicle compartment. The HUD projects a display image formed by the projector onto a projection area defined on a front windshield as a projection member. The light of the image reflected by the front windshield toward the vehicle compartment is perceived by the driver seated on the driver seat. As a result, the driver can visually recognize the virtual image of the display image formed in front of the front windshield with part of the foreground overlapped. The HUD may be configured to project a display image on a combiner provided in front of the driver seat instead of the front windshield. Hereinafter, a case where the indicator 18 is the meter MID will be described as an example.

The HCU 10 is mainly configured by a computer including a processor, a volatile memory, a nonvolatile memory, an I/O, and a bus that connects these. The HCU 10 is connected to the indicator 18 and the in-vehicle LAN. The HCU 10 controls display on the indicator 18 by executing a control program stored in the nonvolatile memory. The HCU 10 corresponds to a vehicle display control device. In the present embodiment, a case where the HCU 10 is used in a vehicle capable of performing at least non-monitoring-obligation automated driving as automated driving will be described as an example. The configuration of the HCU 10 regarding control of display on the indicator 18 will be described in detail below.

Figure 2:
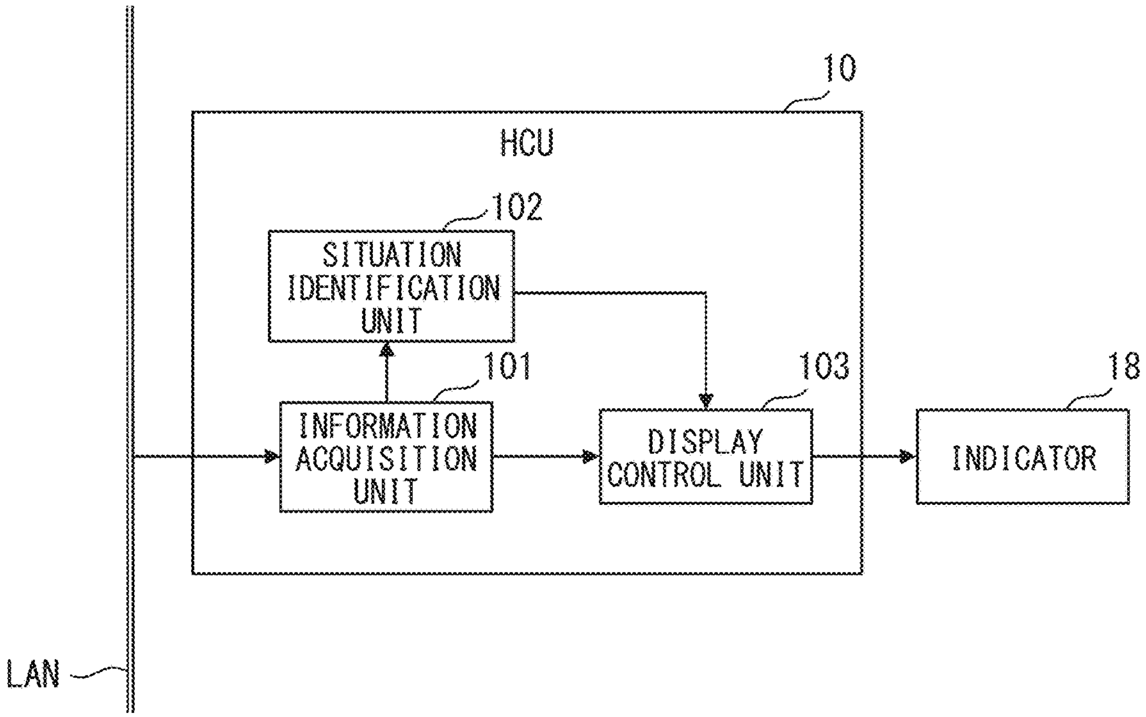
FIG. 2 is a diagram illustrating an example of a schematic configuration of an HCU.

Next, a schematic configuration of the HCU 10 will be described with reference to FIG. 2. As illustrated in FIG. 2, the HCU 10 includes an information acquisition unit 101, a situation identification unit 102, and a display control unit 103 as functional blocks for display control on the indicator 18. In addition, execution of processing of each functional block of the HCU 10 by the computer corresponds to execution of the vehicle display control method. Some or all of the functions executed by the HCU 10 may be configured as hardware by one or a plurality of ICs or the like. In addition, some or all of the functional blocks included in the HCU 10 may be realized by a combination of execution of software by a processor and a hardware member.

The information acquisition unit 101 acquires information input from the outside of the HCU 10. The information acquisition unit 101 acquires information via, for example, an in-vehicle LAN. For example, information acquisition unit 101 acquires a recognition result by the travel environment recognition unit of automated driving ECU 17. The information acquisition unit 101 acquires a determination result by the action determination unit of automated driving ECU 17. The information acquisition unit 101 acquires sensing information detected by the vehicle state sensor 14. The information acquisition unit 101 acquires the traffic congestion information received by the communication module 11.

The situation identification unit 102 identifies the situation of the host vehicle. The situation identification unit 102 identifies the situation of the host vehicle from the information acquired by the information acquisition unit 101. The process by the situation identification unit 102 corresponds to a situation identification step.

The situation identification unit 102 may identify the current automation level of the host vehicle based on the determination result by the action determination unit, the result being obtained from the automated driving ECU 17. More specifically, the situation identification unit 102 may identify the current automation level of the host vehicle based on the information about the switching of the automation level in the action determination unit. It is preferable that with respect to the automation level of LV3, the situation identification unit 102 distinguishes and identifies the area-limited automated driving and the traffic congestion limited automated driving. Whether the situation identification unit 102 identifies that the automation level of the host vehicle is LV3 or higher corresponds to whether the automated driving with monitoring obligation is identified. Whether the situation identification unit 102 identifies that the automation level of the host vehicle is LV4 or higher corresponds to whether the sleep permitted automated driving is identified.

It is preferable that the situation identification unit 102 identifies a situation (hereinafter, traffic congestion clear start situation) in which the traffic congestion in which the host vehicle is caught starts to be cleared during the traffic congestion limited automated driving. The situation identification unit 102 may identify the traffic congestion clear start situation based on the speed of the host vehicle detected by the vehicle speed sensor of the vehicle state sensor 14. As an example, in a case where the speed of the host vehicle continues for a certain period and is equal to or higher than the speed estimated as the traffic congestion, the traffic congestion clear start situation may be identified. The certain period referred to herein may be set in any period. The situation identification unit 102 may identify the traffic congestion clear start situation based on the speed of the preceding vehicle of the host vehicle recognized by the travel environment recognition unit of the automated driving ECU 17. As an example, in a case where the speed of the preceding vehicle continues for a certain period and is equal to or higher than the speed estimated as the traffic congestion, the traffic congestion clear start situation may be identified. The situation identification unit 102 may identify the traffic congestion clear start situation based on the traffic congestion information received by the communication module 11. As an example, the traffic congestion clear start situation may be identified in a case where the distance between the end point of the traffic congestion section indicated by the traffic congestion information and the host vehicle position is equal to or less than a threshold value. The threshold value referred to herein may be set in any value.

The situation identification unit 102 identifies a situation in which the driver of the host vehicle grips the handle from the detection result by the grip sensor of the vehicle state sensor 14. The situation identification unit 102 identifies a situation in which the driver of the host vehicle operates the accelerator pedal from the detection result by the accelerator sensor of the vehicle state sensor 14.

The display control unit 103 controls display on the indicator 18. The display control unit 103 controls display of information (hereinafter, travel related information) related to traveling of the host vehicle on the indicator 18. The process by the display control unit 103 corresponds to a display control step. Examples of the travel related information include information related to an instrument of the vehicle (instrument related information), information related to an operation state of the automated driving function (hereinafter, the AD related information), and information indicating a travel environment (hereinafter, travel environment related information). Examples of the vehicle instrument related information include information of a revolution speedometer (hereinafter, a tachometer), a speedometer (hereinafter, speedometer), a mileage meter (Odometer), and a fuel meter. Examples of the AD-related information include information indicating whether the ACC control is performed, whether the LTA control is performed, whether the LCA control is performed, and an automation level. Examples of the travel environment related information include a position of a surrounding vehicle with respect to the host vehicle, information about a section line, and the like.

The display control unit 103 reduces the travel related information to be displayed on the indicator 18 during the non-monitoring-obligation automated driving, compared with during the driving (hereinafter, monitoring-obligation driving) with the surrounding monitoring obligation. The monitoring-obligation driving referred to herein may include manual driving of LV0 or may be limited to automated driving of LV2. On the other hand, even during the non-monitoring-obligation automated driving, the display control unit 103 suppresses reduction of the travel related information according to the situation of the host vehicle other than a state of whether the non-monitoring-obligation automated driving is being performed, which is identified by the situation identification unit 102. According to this, it is possible to reduce the amount of display of the travel related information during the non-monitoring-obligation automated driving, compared with during the monitoring-obligation driving. In addition, even during non-monitoring-obligation automated driving, reduction of the travel related information is suppressed according to the situation of the vehicle other than a state of whether the vehicle is during non-monitoring-obligation automated driving. Therefore, in a situation of the vehicle in which convenience for the driver is deteriorated when the travel related information is reduced, reduction of the travel related information can be suppressed. As a result, even in a case where the amount of display of information related to traveling is reduced during non-monitoring-obligation automated driving, it is possible to suppress deterioration of convenience for the driver.

It is preferable that the display control unit 103 reduces information related to the behavior of the host vehicle itself (hereinafter, the behavior related information) in the travel related information to be displayed on the indicator 18 during the traffic congestion limited automated driving in the non-monitoring-obligation automated driving, compared with during the monitoring-obligation driving. During the traffic congestion limited automated driving, since the host vehicle maintains a low speed, a change in behavior is small. Therefore, during the traffic congestion limited automated driving, the convenience for the driver is less likely to deteriorate even if the behavior related information is reduced. An example of the behavior related information includes instrument related information. The behavior related information to be omitted may be, for example, information about Odometer. The behavior related information to be reduced may be information (hereinafter, overlapping information) in which information having the same content in the host vehicle is redundantly indicated in another expression or another form. An example of the overlapping information includes an image imitating a speedometer in a case where the vehicle speed is indicated in an overlapping manner by a number and an image imitating a speedometer. In a case where the host vehicle is an electric vehicle, information related to regenerative braking may also be included in the behavior related information. An example of the information about regenerative braking includes information about the amount of power recovered by regenerative braking. Examples of the electric vehicle include an electric car (EV) and a plug-in hybrid vehicle.

An example of reduction of the behavior related information will be described with reference to FIGS. 3 and 4. MI in the figure indicates a display screen of the indicator 18. SMI represents an image (hereinafter, speedometer image) imitating a speedometer. In SMI, a scale corresponding to the vehicle speed of the host vehicle is indicated by a needle. TMI represents an image simulating a tachometer (tachometer image). In the TMI, the needle indicates a scale corresponding to the rotation speed of the internal combustion engine or the motor for travel driving of the host vehicle. SI represents an image (hereinafter, the vehicle speed numerical value image) in which the vehicle speed of the host vehicle is represented by a number. SMI and SI overlap each other in terms of vehicle speed. PLI represents an image (hereinafter, the section line image) indicating a section line. The section line may be referred to as a lane boundary line. HVI represents an image (hereinafter, host vehicle image) indicating the host vehicle. OVI represents an image (hereinafter, surrounding vehicle image) indicating a surrounding vehicle for the host vehicle.

Figure 3:
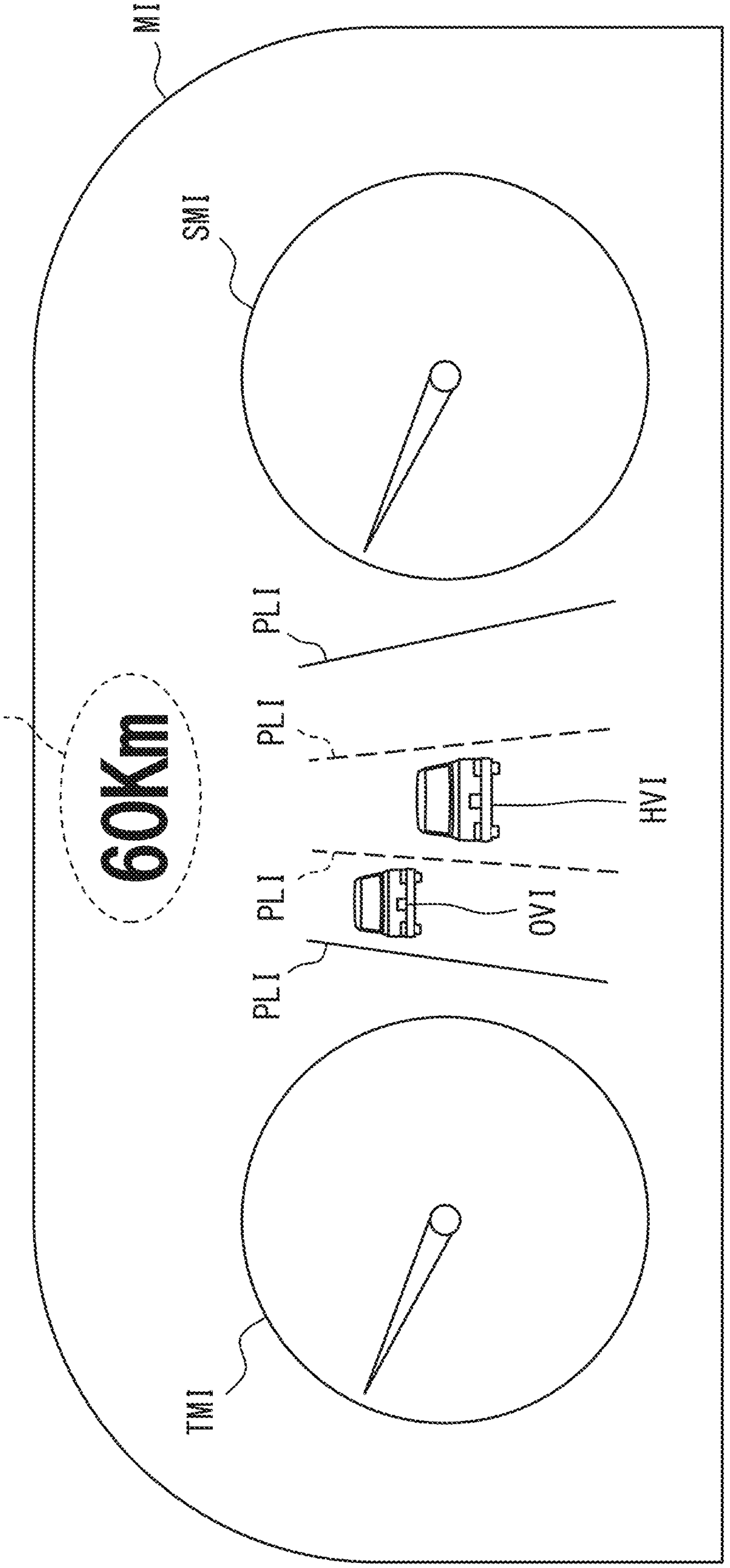
FIG. 3 is a diagram illustrating an example of a display screen of an indicator during the monitoring-obligation driving.
Figure 4:
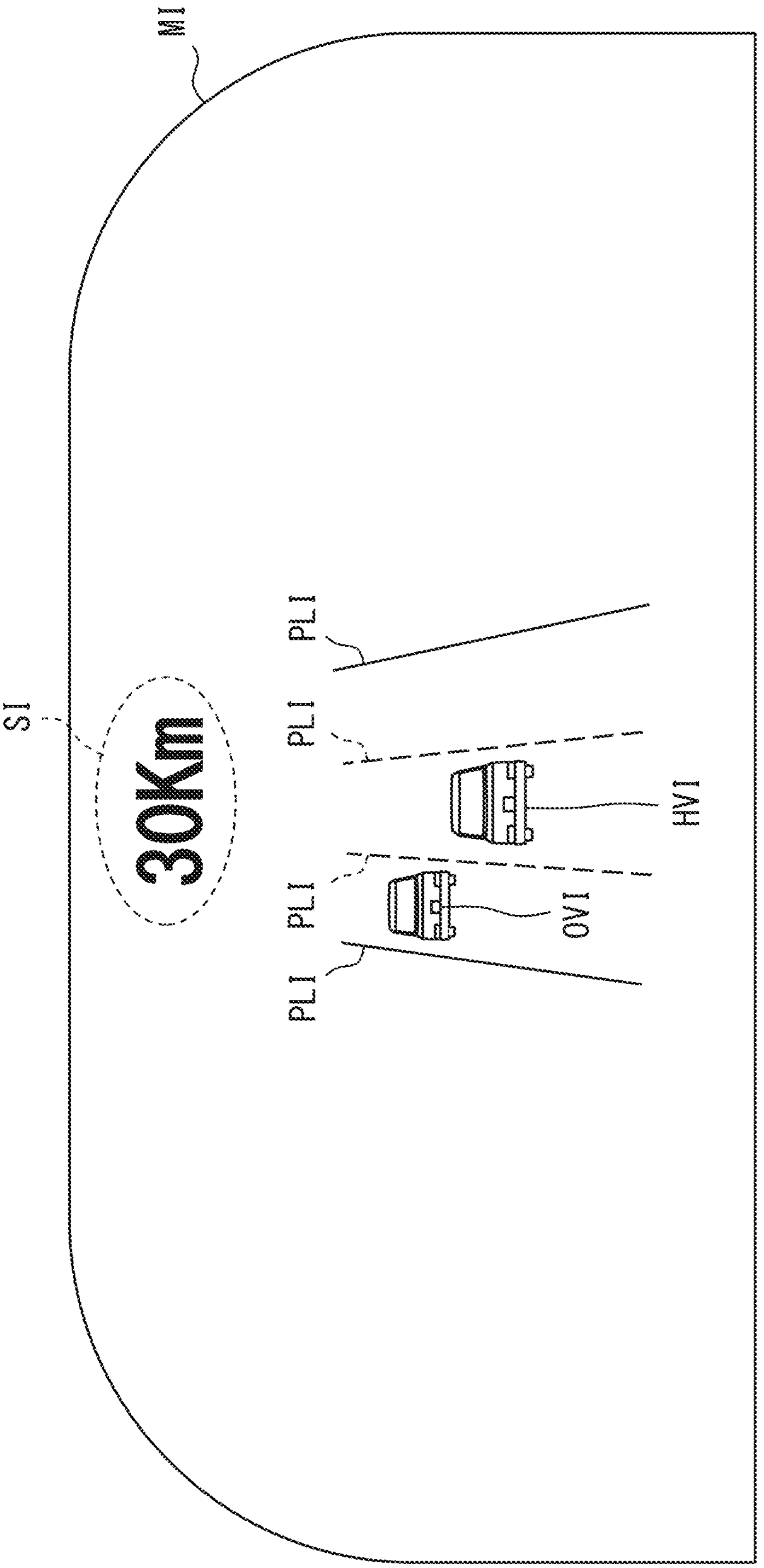
FIG. 4 is a view illustrating an example of a display screen of the indicator during traffic congestion limited automated driving.

FIG. 3 is an example of a display screen of the indicator 18 during the monitoring-obligation driving. As illustrated in FIG. 3, during the monitoring-obligation driving, a speedometer image, a tachometer image, and a vehicle speed numerical value image, which are behavior related information, and a section line image, a host vehicle image, and a surrounding vehicle image, which are travel environment related information, are displayed on the display screen of the indicator 18. FIG. 4 is an example of a display screen of the indicator 18 during the traffic congestion limited automated driving. As illustrated in FIG. 4, during the traffic congestion limited driving, a vehicle speed numerical value image as the behavior related information, and a section line image, a host vehicle image, and a surrounding vehicle image as the travel environment related information are displayed on the display screen of the indicator 18. As illustrated in FIG. 4, display of the speedometer image and the tachometer image, which are the behavior related information, during the traffic congestion limited automated driving are omitted, compared with during the monitoring-obligation driving. Since the change in behavior is small during the traffic congestion limited automated driving, the convenience for the driver is less likely to deteriorate even if the tachometer image is omitted. Further, even when the speedometer image corresponding to the overlapping information is omitted, the convenience for the driver is less likely to deteriorate.

The behavior related information may be reduced not only during the traffic congestion limited automated driving but also during the area-limited automated driving. The behavior related information may be reduced not only during the traffic congestion limited automated driving but also during the sleep permitted automated driving.

It is preferable that even during non-monitoring-obligation automated driving, the display control unit 103 suppresses reduction of the behavior related information of the host vehicle identified by the situation identification unit 102 is during area-limited automated driving, compared with in a case where the situation is during the traffic congestion limited automated driving. There are more changes in behavior during the area-limited automated driving than during the traffic congestion limited automated driving. Therefore, reduction of the behavior related information is suppressed during the area-limited automated driving, whereby the convenience for the driver can be made less likely to deteriorate. As an example, the display control unit 103 may be configured to suppress the reduction of the behavior related information by displaying the behavior related information during the area-limited automated driving same as that during the monitoring-obligation driving. The display control unit 103 may be configured to suppress the reduction of the behavior related information during the area-limited automated driving more than during the traffic congestion limited automated driving while omitting the behavior related information during the area-limited automated driving more than during the monitoring-obligation driving. For example, while both the speedometer image and the tachometer image of the behavior related information may be omitted during the traffic congestion limited automated driving, the speedometer image may be omitted but the tachometer image may not be omitted during the area-limited automated driving.

The configuration in which the reduction of the behavior related information is suppressed may be a configuration in which the amount of information of the behavior related information to be omitted is reduced. The configuration in which the reduction of the behavior related information is suppressed may be a configuration in which the amount of information of the behavior related information is reduced by a default amount and then increased by the amount to be suppressed.

It is preferable that the display control unit 103 reduces the behavior related information in a case where the situation of the host vehicle identified by the situation identification unit 102 is during the sleep permitted automated driving, compared with in a case where the situation during the area-limited automated driving. During the sleep permitted automated driving, the driver may be sleeping. Therefore, even in a case where the behavior related information is reduced during the sleep-permitted automated driving, compared with during the area-limited automated driving, the convenience for the driver is less likely to be deteriorated. In addition, it is preferable that in a case where the situation of the host vehicle identified by the situation identification unit 102 is during the sleep permitted automated driving, the display control unit 103 sets the amount of information of the behavior related information to be the same as that during the traffic congestion limited automated driving. During the sleep permitted automated driving, the driver may be sleeping. Therefore, even in a case where the behavior related information is reduced as much as in the case of the traffic congestion limited automated driving, it is difficult to lower the convenience for the driver.

It is preferable that display control unit 103 reduce the behavior related information to be displayed on indicator 18 during the non-monitoring-obligation automated driving, compared with during the monitoring-obligation driving, and increase the amount of information of the travel environment related information. For example, the display control unit 103 may reduce the behavior related information to be displayed on the indicator 18 during the traffic congestion limited automated driving, compared with during the automated driving of LV2, and may increase the amount of information of the travel environment related information. This is because when the amount of information of the travel environment related information increases in a case where there is no surrounding monitoring obligation, the driver can obtain a more sense of security.

Figure 5:
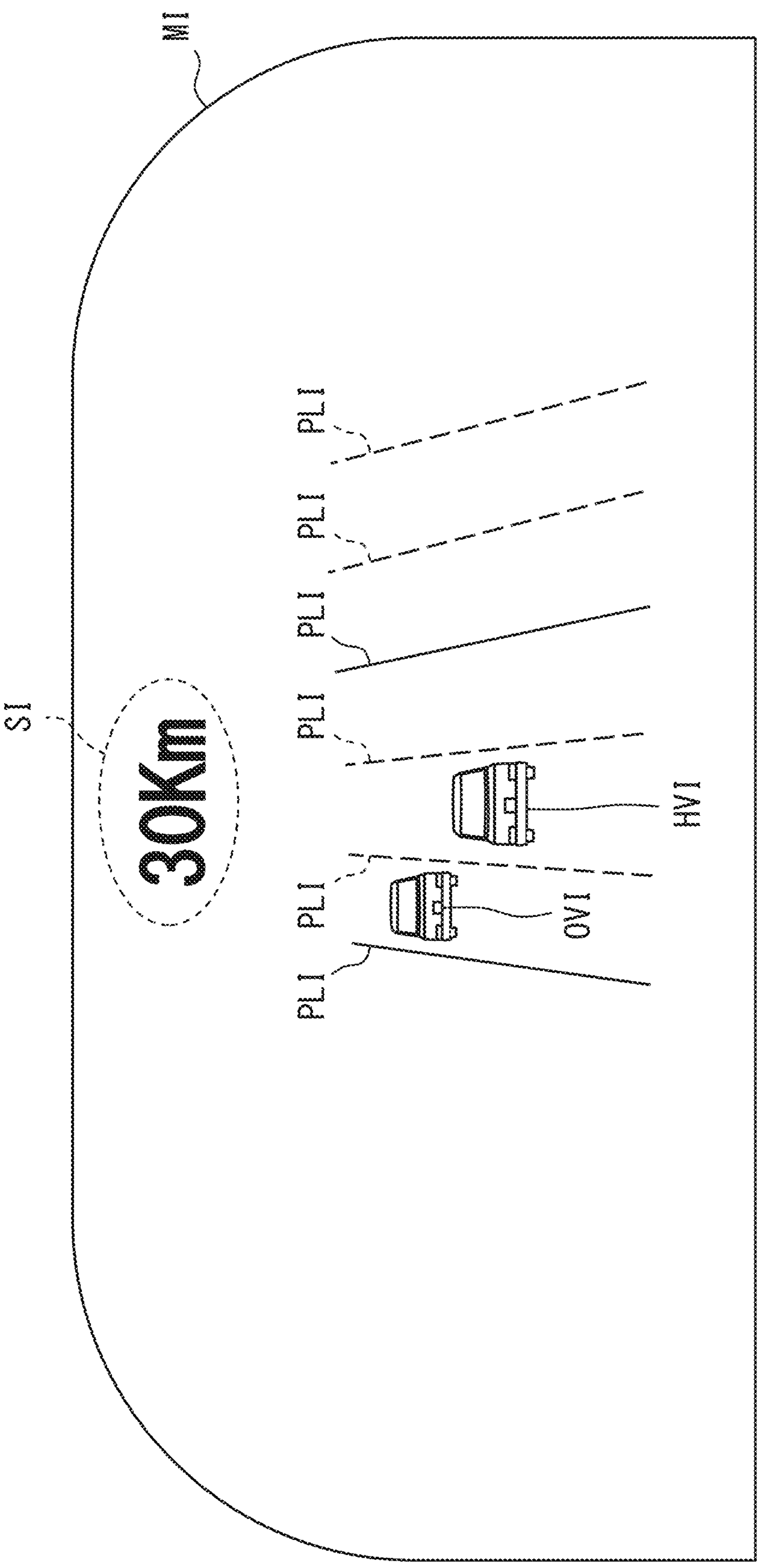
FIG. 5 is a view illustrating an example of a display screen of the indicator during traffic congestion limited automated driving.

An example of reduction of the behavior related information and increase in the travel environment related information will be described with reference to FIG. 5. FIG. 5 is an example of a display screen of the indicator 18 during the traffic congestion limited automated driving. As illustrated in FIG. 5, the display of the speedometer image and the tachometer image, which are the behavior related information, are omitted during the traffic congestion limited automated driving, compared with during the monitoring-obligation driving. On the other hand, the number of section lines indicated by the section line image in the travel environment related information is increased, compared with that during the non-monitoring-obligation automated driving (see FIG. 3). In this example, the amount of information of the section line image is increased, but the amount of information of the travel environment related information other than the section line image may be increased. For example, the amount of information on images of another vehicle may be increased as the number of section lines to be displayed increases.

It is preferable that even during non-monitoring-obligation automated driving, in a case where the situation of the host vehicle identified by the situation identification unit 102 is a situation in which the driver of the host vehicle grips the handle, the display control unit 103 suppresses reduction of the behavior related information. It is preferable that even during the traffic congestion limited automated driving, in a case where the situation of the host vehicle identified by the situation identification unit 102 is a situation in which the driver of the host vehicle grips the handle, the display control unit 103 suppresses reduction of the behavior related information. It is preferable that even during non-monitoring-obligation automated driving, in a case where the situation of the host vehicle identified by the situation identification unit 102 is a situation in which the driver of the host vehicle operates the accelerator pedal, the display control unit 103 suppresses reduction of the behavior related information. It is preferable that even during the traffic congestion limited automated driving, in a case where the situation of the host vehicle identified by the situation identification unit 102 is a situation in which the driver of the host vehicle operates the accelerator pedal, the display control unit 103 suppresses reduction of the behavior related information. According to this, since the display of the indicator 18 changes according to the operation by the driver, the convenience for the driver is improved. An example of suppression of reduction of the behavior related information may be as follows. In a case where the display control unit 103 omits display of the speedometer image and the tachometer image during non-monitoring-obligation automated driving, omission of display of the speedometer image and the tachometer image may be suppressed. The reduction and suppression of reduction of the behavior related information may be performed in another manner.

The display control unit 103 suppresses reduction of the behavior related information based on the situation of the host vehicle identified by the situation identification unit 102 being a situation in which the driver of the host vehicle grips the handle, and increases the amount of information of the behavior related information, compared with when the behavior related information is reduced. The display control unit 103 suppresses reduction of the behavior related information based on the situation of the host vehicle identified by the situation identification unit 102 being a situation in which the driver of the host vehicle operates the accelerator pedal, and increases the amount of information of the behavior related information, compared with when the behavior related information is reduced. It is preferable that in a case where the amount of information of the behavior related information is increased in this way, the display control unit 103 continues the display of the increased behavior related information until at least a prescribed time elapses from the start of the suppression of the reduction of the behavior related information. It is preferable that the display of the increased behavior related information is continued until the above-described prescribed time elapses even in a case where the situation is switched to the situation where the handle is not gripped. It is preferable that the display of the increased behavior related information is continued until the above-described prescribed time elapses even in a case where the situation is switched to the situation where the accelerator pedal is not operated. According to this, it is possible to suppress botheration that the display changes too frequently according to the operation by the driver while enabling the display of the indicator 18 to be changed according to the operation by the driver. The prescribed time referred to herein may be any time that can be set.

In a case where the display control unit 103 reduces the behavior related information during the traffic congestion limited automated driving, it is preferable to terminate the reduction of the behavior related information before the traffic congestion limited automated driving is terminated based on the situation identification unit 102 identifying the traffic congestion clear start situation. According to this, the driver can receive the provision of the behavior related information without reduction before the traffic congestion limited automated driving is terminated, and it is possible to prepare for the driving after the termination of the traffic congestion limited automated driving early. In a case where the traffic congestion limited automated driving is terminated, driving may transition to the monitoring-obligation driving.

Figure 6:
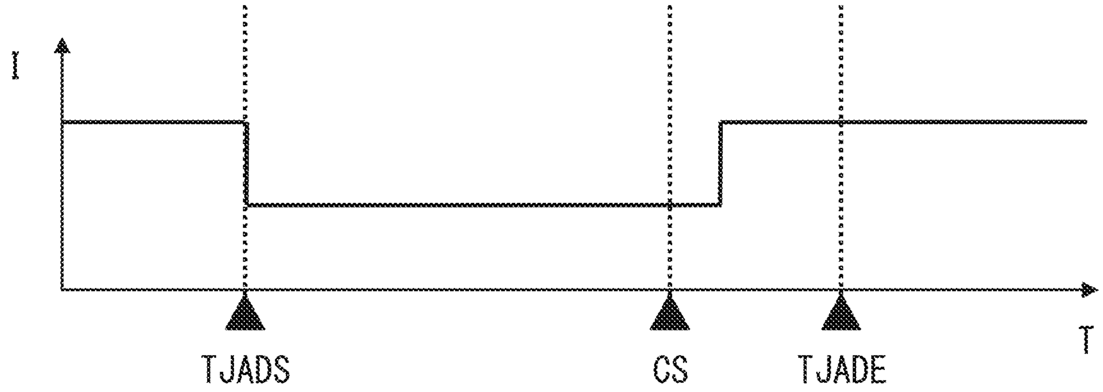
FIG. 6 is a diagram for describing an example of a termination timing of reduction of the behavior related information during the traffic congestion limited automated driving.

An example of the termination timing of the reduction of the behavior related information during the traffic congestion limited automated driving will be described with reference to FIG. 6. T in the figure indicates time, and I indicates an amount of information of the behavior related information. TJADS indicates the start timing of the traffic congestion limited automated driving. TJADE indicates the timing of termination of the traffic congestion limited automated driving. The CS indicates the specific timing at which the situation identification unit 102 identifies the traffic congestion clear start situation. In the example of FIG. 6, a case will be described as an example in which after the monitoring-obligation driving transitions to the traffic congestion limited automated driving, the traffic congestion limited automated driving is terminated because the traffic congestion is resolved. In a case where the traffic congestion limited automated driving is terminated, driving may transition to the monitoring-obligation driving. As illustrated in FIG. 6, when the monitoring-obligation driving transitions to the traffic congestion limited automated driving, the behavior related information to be displayed on the indicator 18 is reduced. On the other hand, when the situation identification unit 102 identifies the traffic congestion clear start situation, the reduction of the behavior related information is lifted before the traffic congestion limited automated driving is lifted.

An example of a flow of processing (hereinafter, display control-related process) related to the control of the display of the travel related information in the HCU 10 will be described with reference to the flowchart of FIG. 7. The flowchart of FIG. 7 may be started in a case where, for example, a switch (hereinafter, a power switch) for starting the internal combustion engine or the motor generator of the host vehicle is turned on. In addition, in the case of a configuration in which on/off of the automated driving function can be switched, a configuration may be such that in which the fact that the automated driving function is turned on may be added to the condition.

First, in step S1, in a case where the situation identification unit 102 identifies that the automation level of the host vehicle is LV3 or higher (YES in S1), the process proceeds to step S2. That is, in a case where the situation identification unit 102 identifies that the host vehicle is in non-monitoring-obligation automated driving, the process proceeds to step S2. On the other hand, in a case where the automation level of the host vehicle is identified to be lower than LV3 (NO in S1), the process proceeds to step S13.

In step S2, in a case where the situation identification unit 102 identifies that the automation level of the host vehicle is greater than or equal to LV4 (YES in S2), the process proceeds to step S9. That is, in a case where the situation identification unit 102 identifies that the host vehicle is in the sleep permitted automated driving, the process proceeds to step S9. On the other hand, in a case where the automation level of the host vehicle is identified to be LV3 (NO in S2), the process proceeds to step S3.

In step S3, in a case where the situation identification unit 102 identifies that the automation level of the host vehicle is the traffic congestion limit LV3 (YES in S3), the process proceeds to step S4. That is, in a case where the situation identification unit 102 identifies that the host vehicle is in the traffic congestion limited automated driving, the process proceeds to step S4. On the other hand, in a case where the automation level of the host vehicle is identified to be the area-limited LV3 (NO in S3), the process proceeds to step S13. That is, in a case where the situation identification unit 102 identifies that the host vehicle is in the area-limited automated driving, the process proceeds to step S13.

In step S4, the display control unit 103 reduces the behavior related information to be displayed on the indicator 18, compared with during the operation of LV2 or less. In step S5, the display control unit 103 increases the amount of information of the travel environment related information.

In step S6, in a case where the situation identification unit 102 identifies a situation in which the driver of the host vehicle grips the handle or operates the accelerator pedal (YES in S6), the process proceeds to step S7. A situation in which the driver of the host vehicle grips the handle or a situation in which the driver operates the accelerator pedal is referred to as a specific operation situation. On the other hand, in a case where the situation identification unit 102 does not identify the specific operation situation (NO in S6), the process proceeds to step S13.

In step S7, the display control unit 103 suppresses reduction of the behavior related information to be displayed on the indicator 18. In step S8, even in a case where the situation identification unit 102 no longer identifies the specific operation situation, for the prescribed time from the start of the suppression of the reduction of the behavior related information, the suppression of the reduction is continued, and the procedure proceeds to step S13.

In step S9, the display control unit 103 reduces the behavior related information to be displayed on the indicator 18, compared with during the operation of LV2 or less. In step S10, in a case where the situation identification unit 102 identifies the specific operation situation (YES in S10), the process proceeds to step S11. On the other hand, in a case where the situation identification unit 102 does not identify the specific operation situation (NO in S10), the process proceeds to step S13.

In step S11, the display control unit 103 suppresses reduction of the behavior related information to be displayed on the indicator 18. In step S12, even in a case where the situation identification unit 102 no longer identifies the specific operation situation, for the prescribed time from the start of the suppression of the reduction of the behavior related information, the suppression of the reduction is continued, and the procedure proceeds to step S13.

In step S13, in a case where it is the timing at which the display control-related process ends (YES in S13), the display control-related process ends. On the other hand, in a case where it is not the timing at which the display control-related process ends (NO in S13), the process returns to S1 and repeats. Examples of the timing at which the display control-related process ends include that the power switch is turned off and that the automated driving function is turned off.

Figure 7:
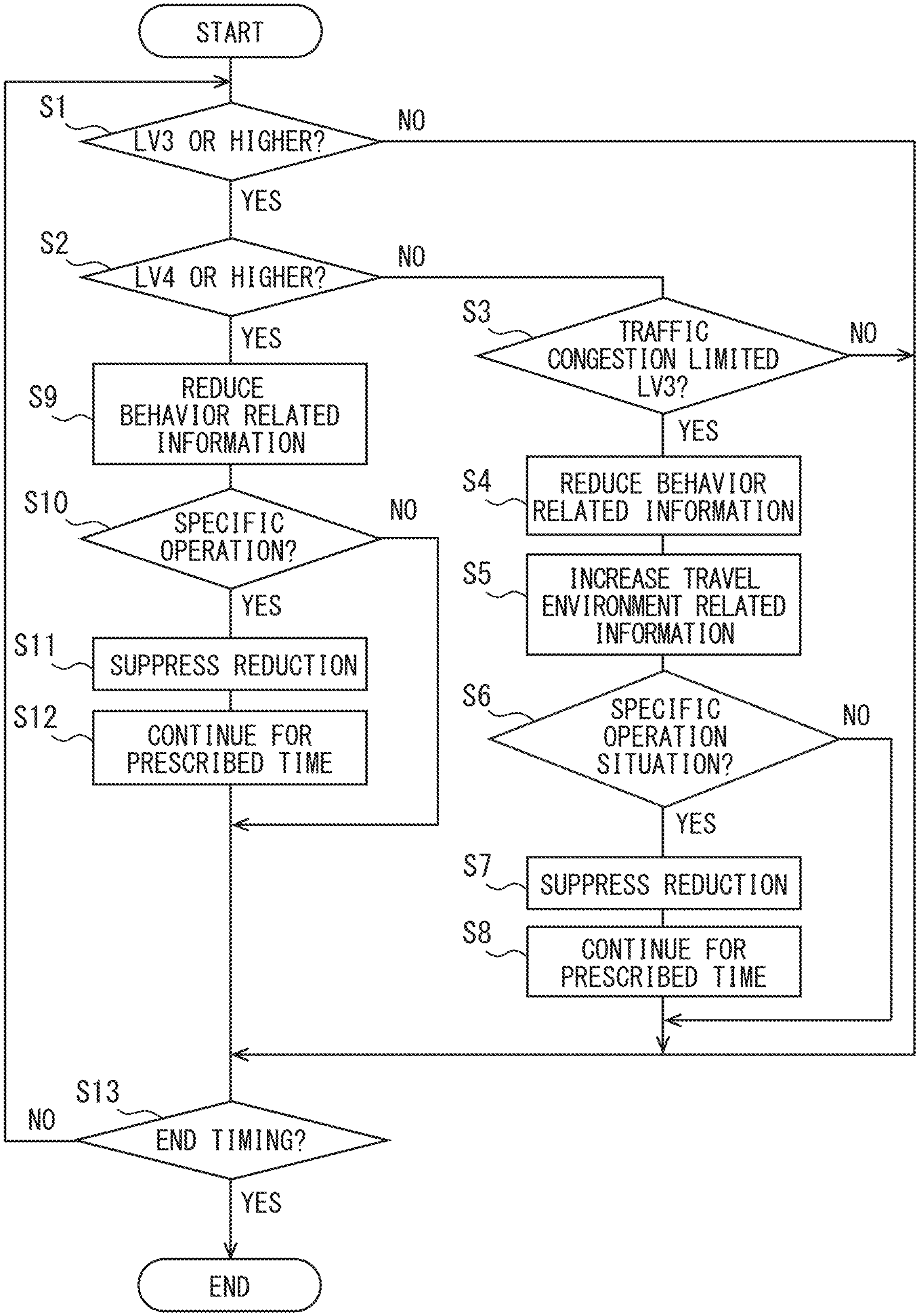
FIG. 7 is a flowchart illustrating an example of a flow of a display control-related process in the HCU.

In FIG. 7, in a case where the host vehicle is in the area-limited automated driving, the behavior related information to be displayed on the indicator 18 is not reduced. However, the present invention is not necessarily limited to this configuration. The behavior related information to be displayed on the indicator 18 may be reduced even in a case where the host vehicle is in the area-limited automated driving, compared with during the driving of LV2 or less. Processing similar to S9 to S12 may be performed. In a case where the host vehicle is in the area-limited automated driving and the behavior related information is reduced, it is preferable to reduce the degree of reduction of the behavior related information, compared with the case of the traffic congestion limited automated driving.

Second Embodiment

The present invention is not limited to the configuration of the above-described embodiment, and may have a configuration of the following second embodiment. Hereinafter, an example of a configuration of the second embodiment will be described with reference to the drawings.

Figure 8:
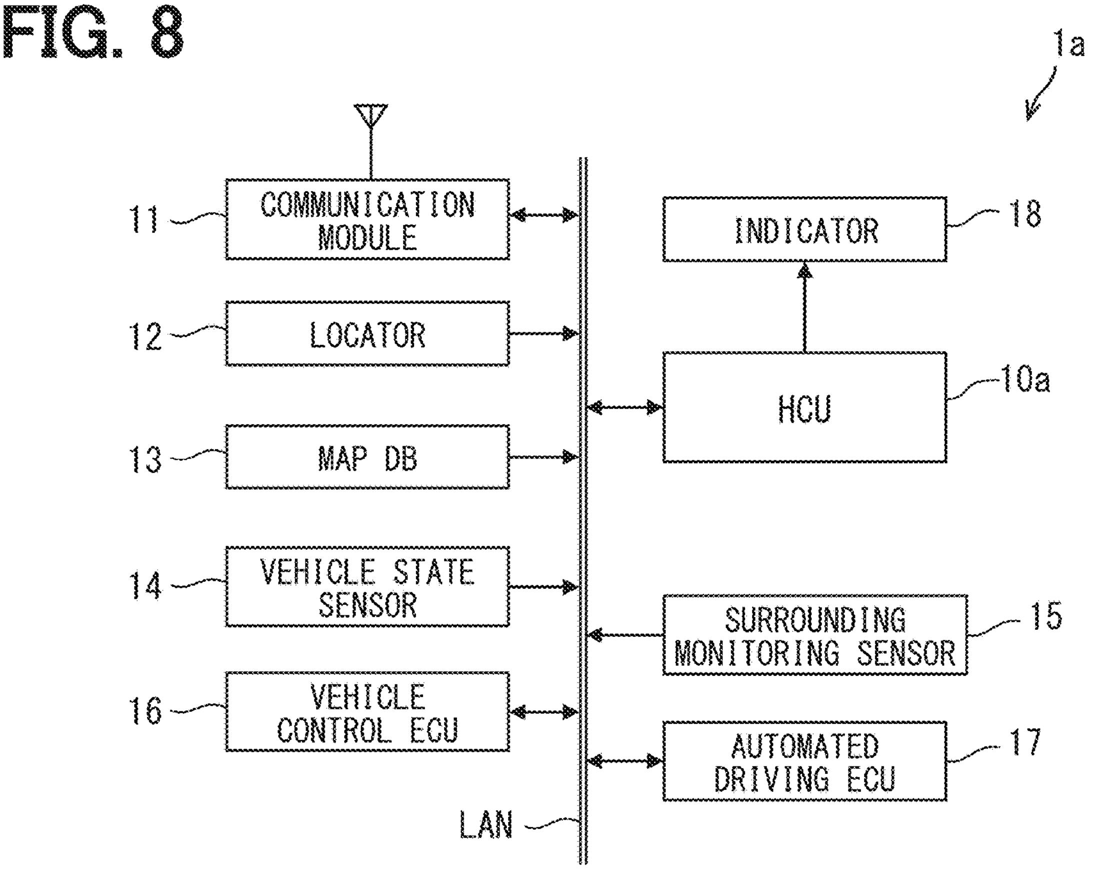
FIG. 8 is a diagram illustrating an example of a schematic configuration of a vehicle system.

A vehicle system 1*a* illustrated in FIG. 8 can be used in an automated driving vehicle. As illustrated in FIG. 8, the vehicle system 1*a* includes an HCU 10*a*, the communication module 11, the locator 12, the map DB 13, the vehicle state sensor 14, the surrounding monitoring sensor 15, the vehicle control ECU 16, the automated driving ECU 17, and the indicator 18. The vehicle system 1*a* is similar to the vehicle system 1 of the first embodiment except that the HCU 10*a* is included instead of the HCU 10.

Figure 9:
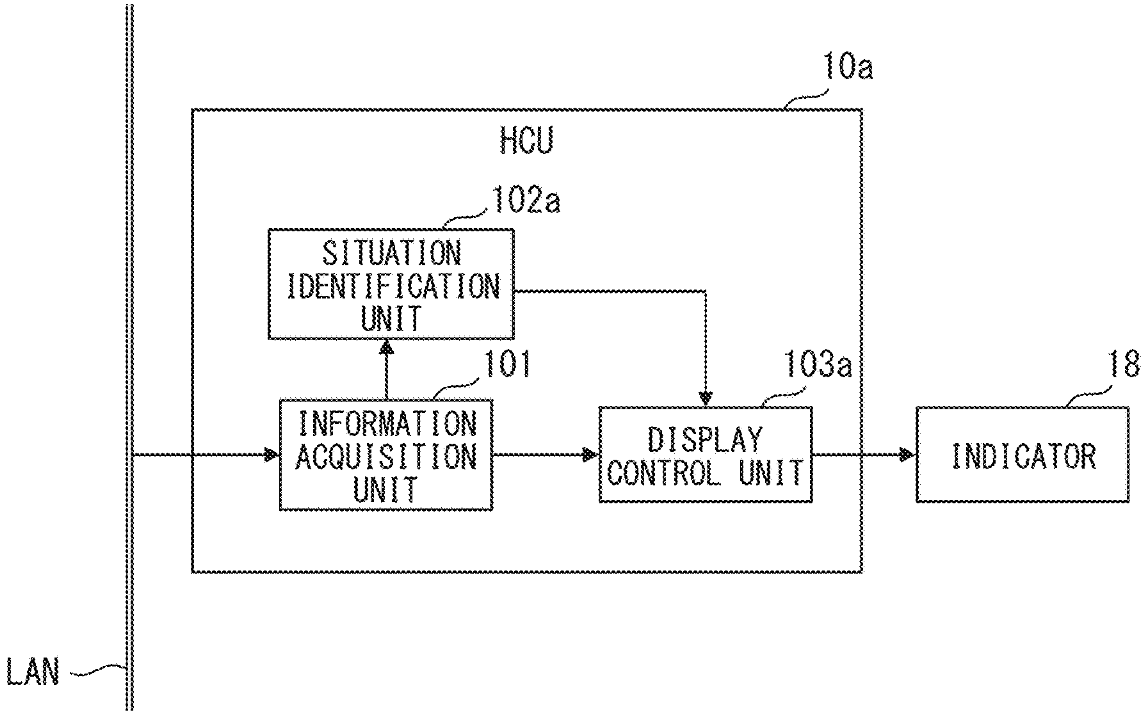
FIG. 9 is a diagram illustrating an example of a schematic configuration of an HCU.

As illustrated in FIG. 9, the HCU 10*a* includes the information acquisition unit 101, a situation identification unit 102*a*, and a display control unit 103*a* as functional blocks. The HCU 10*a* includes the situation identification unit 102*a* instead of the situation identification unit 102. The HCU 10*a* includes the display control unit 103*a* instead of the display control unit 103. The HCU 10*a* is similar to the HCU 10 of the first embodiment except for these components. The HCU 10*a* also corresponds to a vehicle display control device. In addition, execution of processing of each functional block of the HCU 10*a* by the computer corresponds to execution of the vehicle display control method.

The situation identification unit 102*a* is similar to the situation identification unit 102 of the first embodiment except that some processes are different. Hereinafter, this different point will be described. The situation identification unit 102*a* identifies a traveling place of the host vehicle. The situation identification unit 102*a* may identify the traveling place of the host vehicle from the recognition result by the travel environment recognition unit of the automated driving ECU 17. The situation identification unit 102*a* identifies whether the traveling place of the host vehicle is a general road. The general road can be referred to as a road other than the expressway described above. It is preferable that the situation identification unit 102*a* identifies whether the traveling place of the host vehicle is an intersection.

The display control unit 103*a* is similar to the display control unit 103 of the first embodiment except that some processes are different. Hereinafter, this different point will be described. The display control unit 103*a* displays more behavior related information during automated driving at level 2 or higher than during driving at a level lower than level 2 in a case where the vehicle is traveling on a general road. The automated driving at level 2 or higher corresponds to automated driving at a specific level or higher at which both steering and acceleration/deceleration are assisted. The situation identification unit 102*a* identifies whether automated driving at level 2 or higher is being performed. The situation identification unit 102*a* also identifies whether the vehicle is traveling on a general road. A general road has more disturbance than an expressway. Therefore, the driving-mode switching from the automated driving at level 2 or higher to the driving at a level lower than level 2 is likely to be required. In a case where the driving-mode switching occurs, it is easier for the driver to cope with the driving-mode switching if more pieces of behavior related information are displayed for the driver. According to the above configuration, the driver can easily cope with the driving-mode switching in a situation where the driving-mode switching is more likely to occur.

The display control unit 103*a* may display more pieces of behavior related information during automated driving at level 2 or higher than during the manual driving in a case where the vehicle is traveling on a general road. In a case where the driving-mode switching occurs from the automated driving at level 2 or higher, it is conceivable that more behavior related information is required for the driver than in a case where the manual driving is continued. According to the above configuration, the driver can more easily cope with the driving-mode switching in a situation where the driving-mode switching is more likely to occur.

Even during non-monitoring-obligation automated driving, the display control unit 103*a* may suppress reduction of the behavior related information in a case where the situation of the host vehicle identified by the situation identification unit 102*a* is traveling on a general road, compared with a case where the host vehicle is not traveling on the general road. According to this, the driver can easily cope with the driving-mode switching in a situation where the driving-mode switching is more likely to occur.

It is preferable that the display control unit 103*a* displays more pieces of behavior related information in a case where the vehicle is traveling at the intersection during the automated driving at level 2 or higher. That is, more pieces of behavior related information may be displayed in a case of traveling on a general road and at an intersection than, in a case of traveling on a general road but not traveling at an intersection. Whether the vehicle is traveling at the intersection may be identified by the situation identification unit 102*a*. Among general roads, an intersection has more disturbance than a place that is not an intersection. Therefore, the driving-mode switching from the automated driving at level 2 or higher to the driving at a level lower than level 2 is likely to be required. According to the above configuration, the driver can easily cope with the driving-mode switching in a situation where the driving-mode switching is more likely to occur.

Third Embodiment

The present invention is not limited to the configuration of the above-described embodiment, and may have a configuration of the following third embodiment. Hereinafter, an example of a configuration of the third embodiment will be described with reference to the drawings.

Figure 10:
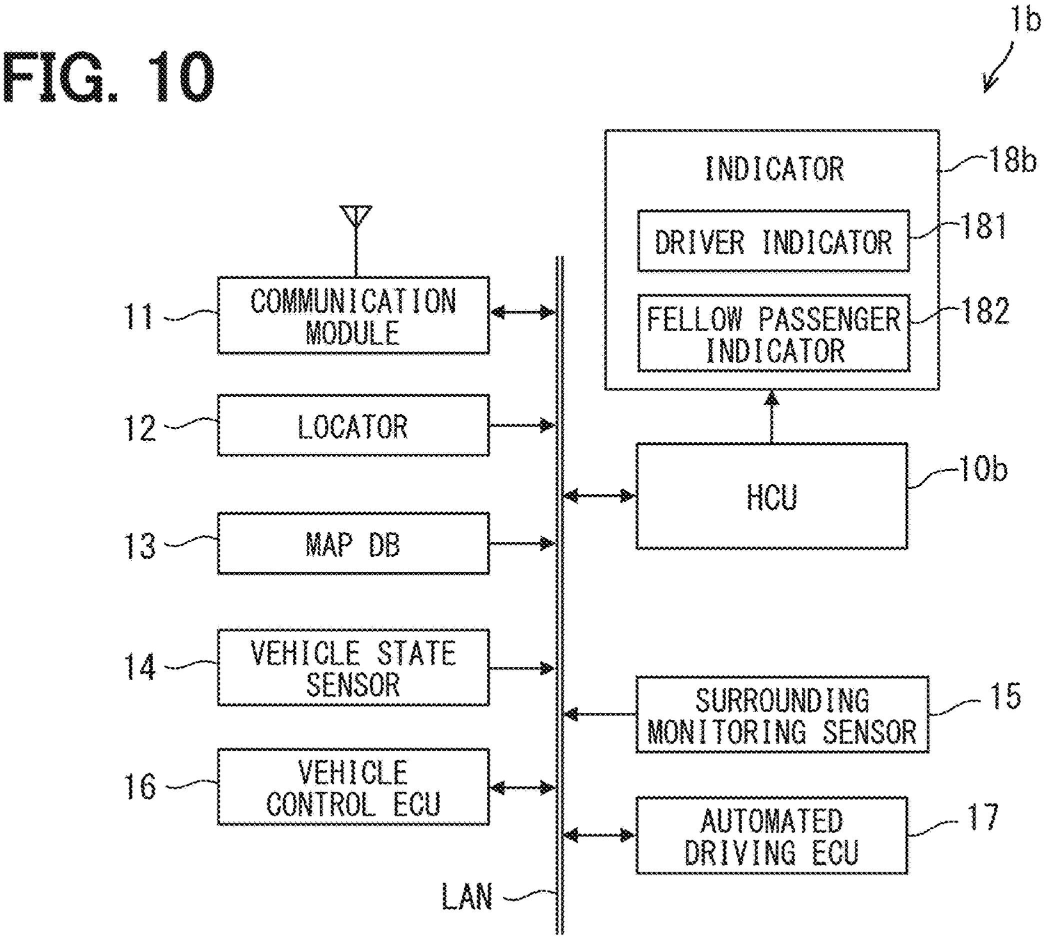
FIG. 10 is a diagram illustrating an example of a schematic configuration of a vehicle system.

A vehicle system 1*b* illustrated in FIG. 10 can be used in an automated driving vehicle. As illustrated in FIG. 10, the vehicle system 1*b* includes an HCU 10*b*, the communication module 11, the locator 12, the map DB 13, the vehicle state sensor 14, the surrounding monitoring sensor 15, the vehicle control ECU 16, the automated driving ECU 17, and an indicator 18*b*. The vehicle system 1*b* includes the HCU 10*b* instead of the HCU 10. The vehicle system 1*b* includes the indicator 18*b* instead of the indicator 18. The vehicle system 1*b* is similar to the vehicle system 1 of the first embodiment except for these components.

The indicator 18*b* includes a driver indicator 181 and a fellow passenger indicator 182. The indicator 18*b* is similar to the indicator 18 of the first embodiment except that it is essential to present information also to a fellow passenger. The driver indicator 181 is the indicator 18*b* for the driver of the host vehicle. The driver indicator 181 may be the indicator 18*b* whose display area is located in front of the driver seat. An example of the driver indicator 181 is a meter MID. The driver indicator 181 may be an HUD. The fellow passenger indicator 182 is the indicator 18*b* provided so as to be visually recognizable by the fellow passenger. The fellow passenger is an occupant of the host vehicle other than the driver. The indicator 18*b* provided so as to be visually recognizable by the fellow passenger does not include the driver indicator 181. Examples of the indicator 18*b* provided so as to be visible to the fellow passenger include a CID. The fellow passenger indicator 182 may be the indicator 18*b* for a fellow passenger. Examples of the indicator 18*b* for the fellow passenger include the indicator 18 whose display area is located in front of the fellow passenger seat. Examples of the indicator 18*b* for the fellow passenger include an indicator 18*b* provided at the rear seat.

Figure 11:
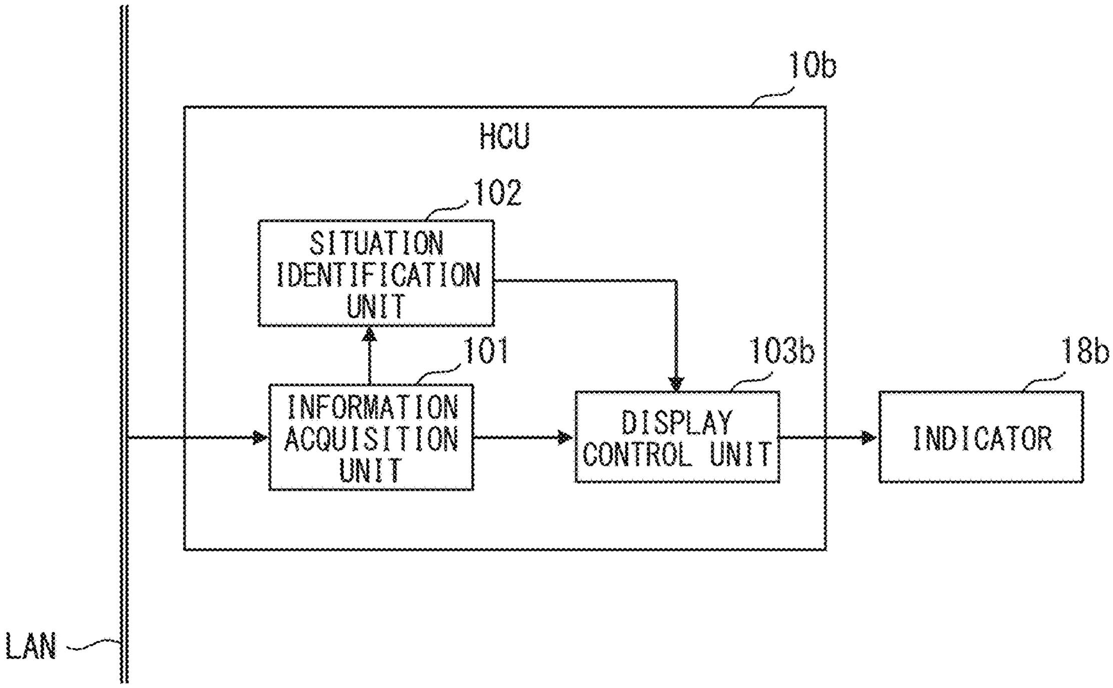
FIG. 11 is a diagram illustrating an example of a schematic configuration of an HCU.

As illustrated in FIG. 11, the HCU 10*b* includes the information acquisition unit 101, the situation identification unit 102, and a display control unit 103*b* as functional blocks. The HCU 10*b* is similar to the HCU 10 of the first embodiment except that a display control unit 103*b* is provided instead of the display control unit 103. The HCU 10*b* also corresponds to a vehicle display control device. In addition, execution of processing of each functional block of the HCU 10*b* by the computer corresponds to execution of the vehicle display control method.

The display control unit 103*b* is similar to the display control unit 103 of the first embodiment except that some processes are different. Hereinafter, this different point will be described. The display control unit 103*a* controls display on the indicator 18*b*. That is, the display control unit 103*a* controls the driver indicator 181 and the fellow passenger indicator 182. The display control unit 103*b* displays, on the fellow passenger indicator 182, the behavior related information during the automated driving at level 2 or higher. On the other hand, in a case where the driving is switched to the driving at a level lower than level 2, the display control unit 103*b* causes the fellow passenger indicator 182 to transition so as to display the entertainment-related content information. Hereinafter, the entertainment-related content information is referred to as the entertainment information. Content such as a moving image can be exemplified as the entertainment information. The entertainment information can be referred to as information corresponding to information used for a second task for the driver.

The display control unit 103*b* may display the behavior related information and the entertainment information on the fellow passenger indicator 182 during the automated driving at level 2 or higher. In a case where there is a plurality of fellow passenger indicators 182 that can be visually recognized by a fellow passenger, the display control unit 103*b* may display the behavior related information on one of them, and may display the entertainment information on the other. As an example, the behavior related information may be displayed on the fellow passenger indicator 182 in which the display area is located in front of the fellow passenger seat, and the entertainment information may be displayed on the CID. In a case where driving is switched to the driving at a level lower than level 2, display may transition so as to display of only the entertainment information out of the behavior related information and the entertainment information. The display control unit 103*b* may display, on the fellow passenger indicator 182, only the behavior related information out of the behavior related information and the entertainment information during the automated driving at level 2 or higher. In a case where driving is switched to the driving at a level lower than level 2, the display of the behavior related information may be terminated, and may transition such that the entertainment information is displayed.

During the automated driving at level 2 or higher, the driver is less involved in the driving. In such a case, by displaying the behavior related information on the fellow passenger indicator 182, the fellow passenger can be aware of the driving situation of the host vehicle in more detail, and the fellow passenger can feel more relieved. On the other hand, during the automated driving at a level less than level 2, the driver is more involved in the driving. In such a situation in which the fellow passenger can feel more relieved, the behavior related information is not performed, and the entertainment information is displayed. Therefore, the fellow passenger can more intensively enjoy the entertainment information, and the fellow passenger can more enjoy the time during driving.

It is preferable that the display control unit 103*b* synchronizes the content to be displayed between the fellow passenger indicator 182 and the driver indicator 181 during the automated driving at level 2 or higher. During the automated driving at level 2 or higher, the driver is less involved in the driving. In such a case, opportunities for conversation between the driver and the fellow passenger increase. According to the above configuration, in such a situation where the opportunities of conversation between the driver and the fellow passenger increase, the driver and the fellow passenger easily share a topic.

During the automated driving at level 1 or higher, the display control unit 103*b* may display, on the fellow passenger indicator 182, the behavior related information. On the other hand, in a case where the driving mode is switched to the manual driving, the display control unit may finish displaying the behavior related information and transition to display of the entertainment information. According to this, the behavior related information can be displayed on the fellow passenger indicator 182 until the fellow passenger can feel particularly relieved, and the fellow passenger can be relieved. In addition, the display control unit 103*b* may synchronize the content to be displayed between the fellow passenger indicator 182 and the driver indicator 181 during the automated driving at level 1 or higher. The driver is less involved in the driving during the automated driving at level 1 or higher than during the manual driving. It is conceivable that there are more opportunities for conversation between the driver and the fellow passenger in such a case than during the manual driving. According to the above configuration, the driver and the fellow passenger can easily share a topic in a situation where there are more opportunities for conversation between the driver and the fellow passenger in such a case than during the manual driving. The automated driving at level 1 or higher can also be simply referred to as automated driving.

It is preferable that the display control unit 103*b* does not display the warning regarding the driving of the host vehicle on the fellow passenger indicator 182 during the automated driving at level 2 or higher. On the other hand, it is preferable that the display control unit 103*b* displays, on the driver indicator 181, the warning regarding the driving of the host vehicle during the automated driving at level 2 or higher. Examples of the warning regarding driving of the host vehicle include a warning for urging a driving-mode switching and the like. The condition is that the vehicle is in the automated driving at level 2 or higher, but the present invention is not necessarily limited thereto. For example, the condition may be that the vehicle is in non-monitoring-obligation automated driving.

It is preferable that the display control unit 103*b* makes the amount of the behavior related information to be displayed on the fellow passenger indicator 182 smaller than the amount of the behavior related information to be displayed on the driver indicator 181 during the non-monitoring-obligation automated driving. This is because the necessity of the behavior related information is lower for the fellow passenger for whom the driving-mode switching is not required even during the same non-monitoring-obligation automated driving. In a case where the amount of the behavior related information to be displayed on the driver indicator 181 is reduced, the display control unit 103*b* makes the amount of the behavior related information to be displayed on the fellow passenger indicator 182 smaller than the amount of the reduction. It is preferable that the display control unit 103*b* makes the amount of the behavior related information to be displayed on the fellow passenger indicator 182 smaller than the amount of the behavior related information to be displayed on the driver indicator 181 during the non-monitoring-obligation automated driving. The condition is that the vehicle is in non-monitoring-obligation automated driving, but the present invention is not necessarily limited thereto. For example, the condition may be that the vehicle is in automated driving at level 1 or higher. Alternatively, the condition may be that the vehicle is in automated driving at level 2 or higher.

Fourth Embodiment

The present invention is not limited to the configuration of the above-described embodiment, and may have a configuration of the following fourth embodiment. Hereinafter, an example of a configuration of the fourth embodiment will be described with reference to the drawings.

Figure 12:
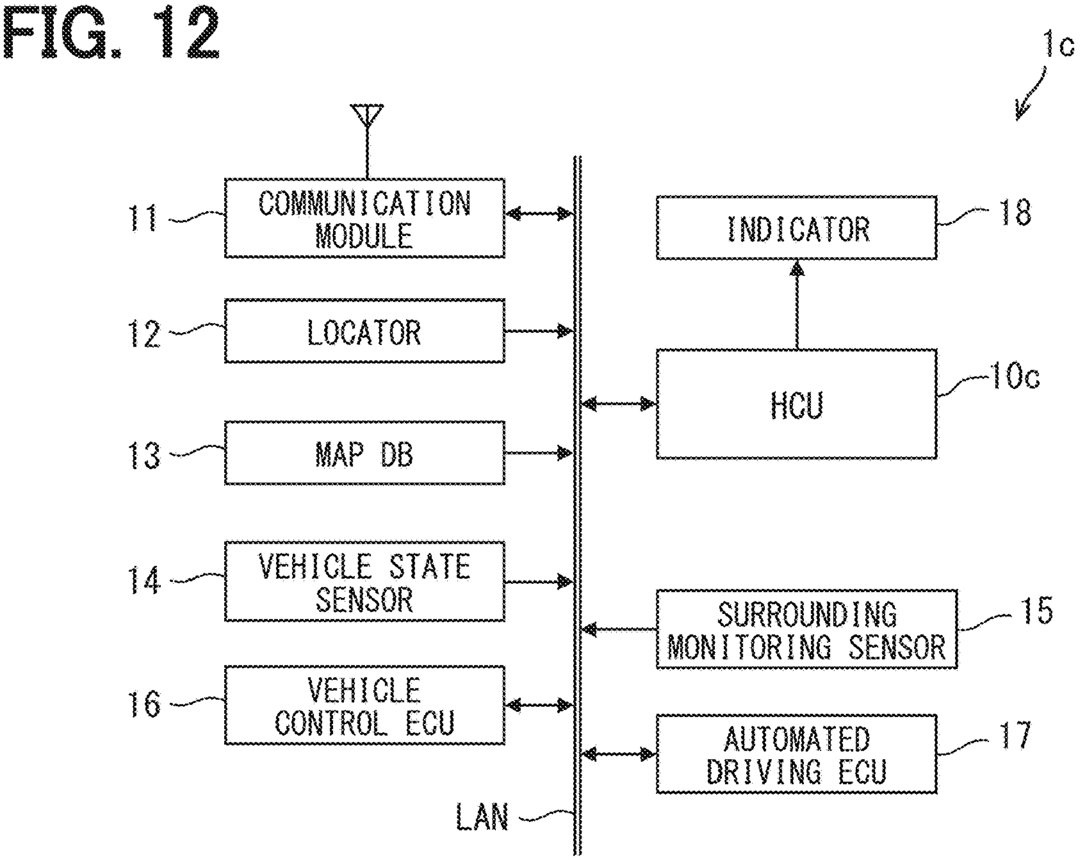
FIG. 12 is a diagram illustrating an example of a schematic configuration of a vehicle system.

A vehicle system 1*c* illustrated in FIG. 12 can be used in an automated driving vehicle. As illustrated in FIG. 12, the vehicle system 1*c* includes an HCU 10*c*, the communication module 11, the locator 12, the map DB 13, the vehicle state sensor 14, the surrounding monitoring sensor 15, the vehicle control ECU 16, the automated driving ECU 17, and the indicator 18. The vehicle system 1*c* is similar to the vehicle system 1 of the first embodiment except that the HCU 10*c* is included instead of the HCU 10.

Figure 13:
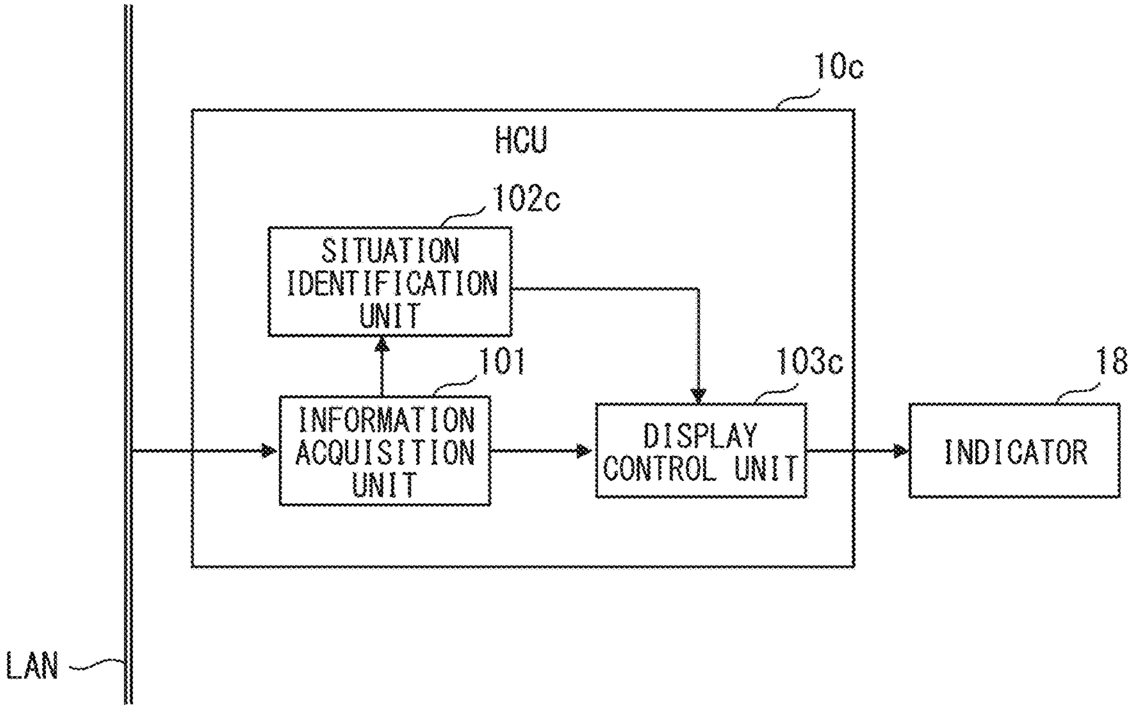
FIG. 13 is a diagram illustrating an example of a schematic configuration of an HCU.

As illustrated in FIG. 13, the HCU 10*c* includes the information acquisition unit 101, a situation identification unit 102*c*, and a display control unit 103*c* as functional blocks. The HCU 10*c* includes the situation identification unit 102*c* instead of the situation identification unit 102. The HCU 10*c* includes the display control unit 103*c* instead of the display control unit 103. The HCU 10*c* is similar to the HCU 10 of the first embodiment except for these components. The HCU 10*c* also corresponds to a vehicle display control device. In addition, execution of processing of each functional block of the HCU 10*c* by the computer corresponds to execution of the vehicle display control method.

The situation identification unit 102*c* is similar to the situation identification unit 102 of the first embodiment except that some processes are different. Hereinafter, this different point will be described. The situation identification unit 102*c* identifies a traveling place of the host vehicle. The situation identification unit 102*c* may identify the traveling place of the host vehicle from the recognition result by the travel environment recognition unit of the automated driving ECU 17. The situation identification unit 102*c* identifies whether the traveling place of the host vehicle is a downhill. The downhill can be referred to as a road section with a downward gradient.

The display control unit 103*c* is similar to the display control unit 103 of the first embodiment except that some processes are different. Hereinafter, this different point will be described. The display control unit 103*c* suppresses reduction of the behavior related information in a case where the host vehicle is traveling on a downhill even during non-monitoring-obligation automated driving. The situation identification unit 102*c* identifies whether the vehicle is traveling on a downhill. During non-monitoring-obligation automated driving, it is conceivable that deceleration is performed by an engine brake on a downhill. During non-monitoring-obligation automated driving, it is difficult for the occupant to recognize whether the vehicle is performing deceleration by the engine brake. Therefore, the occupant tends to feel uneasy about the operation sound of the engine brake. According to the above configuration, by displaying more pieces of behavior related information in a situation where the engine brake operates, this uneasiness is easily reduced.

Fifth Embodiment

The present invention is not limited to the configuration of the above-described embodiment, and may have a configuration of the following fifth embodiment. Hereinafter, an example of a configuration of the fifth embodiment will be described with reference to the drawings.

Figure 14:
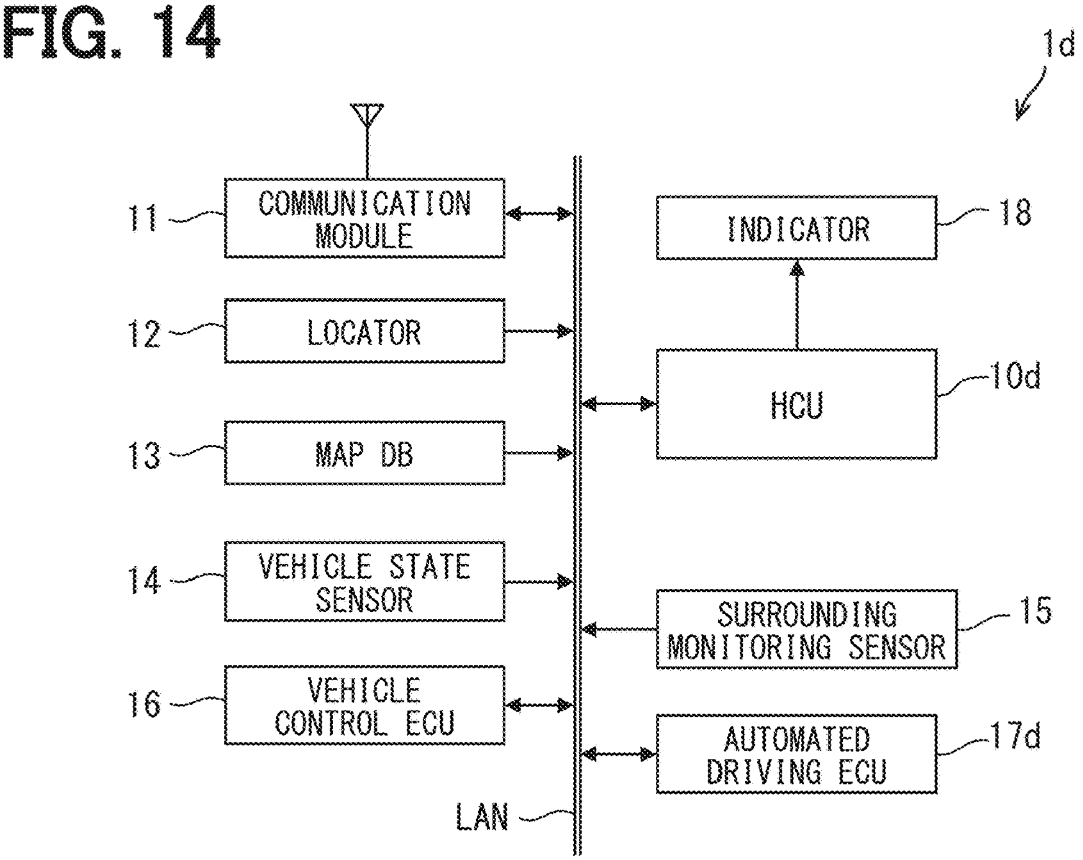
FIG. 14 is a diagram illustrating an example of a schematic configuration of a vehicle system.

A vehicle system 1*b* illustrated in FIG. 14 can be used in an electric vehicle capable of performing automated driving. The electric vehicle may be, for example, an EV. The electric vehicle using a vehicle system 1*d* has a plurality of regeneration modes having different magnitudes of regenerative braking. For example, the modes having different magnitudes of regenerative braking may be modes in which magnitudes of regenerative braking applied in response to release of the accelerator pedal are different. Hereinafter, the magnitude of regenerative braking is referred to as a magnitude of regeneration. The modes having different magnitudes of regeneration include a mode in which regenerative braking is performed and a mode in which regenerative braking is not performed. It is preferable that the modes having different magnitudes of regeneration include a plurality of modes having different magnitudes of regeneration as modes for performing regenerative braking. In the present embodiment, a case where the electric vehicle has a non-regeneration mode in which regenerative braking is not performed, a weak regeneration mode in which regenerative braking is weak, and a strong regeneration mode in which regenerative braking is strong will be described as an example.

As illustrated in FIG. 14, the vehicle system 1*d* includes an HCU 10*d*, the communication module 11, the locator 12, the map DB 13, the vehicle state sensor 14, the surrounding monitoring sensor 15, the vehicle control ECU 16, an automated driving ECU 17*d*, and the indicator 18. The vehicle system 1*d* includes the HCU 10*d* instead of the HCU 10. The vehicle system 1*d* includes the automated driving ECU 17*d* instead of the automated driving ECU 17. The vehicle system 1*d* is similar to the vehicle system 1 of the first embodiment except for these components.

The automated driving ECU 17*d* is similar to the automated driving ECU 17 of the first embodiment except that some processes are different. Hereinafter, this different point will be described. The action determination unit of the automated driving ECU 17*d* may be switched to the regeneration mode as necessary. The automated driving ECU 17*d* may switch the regeneration mode according to the selection input received from the occupant by the input device of the host vehicle. The input device may be a touch switch, a mechanical switch, or a voice input device.

Figure 15:
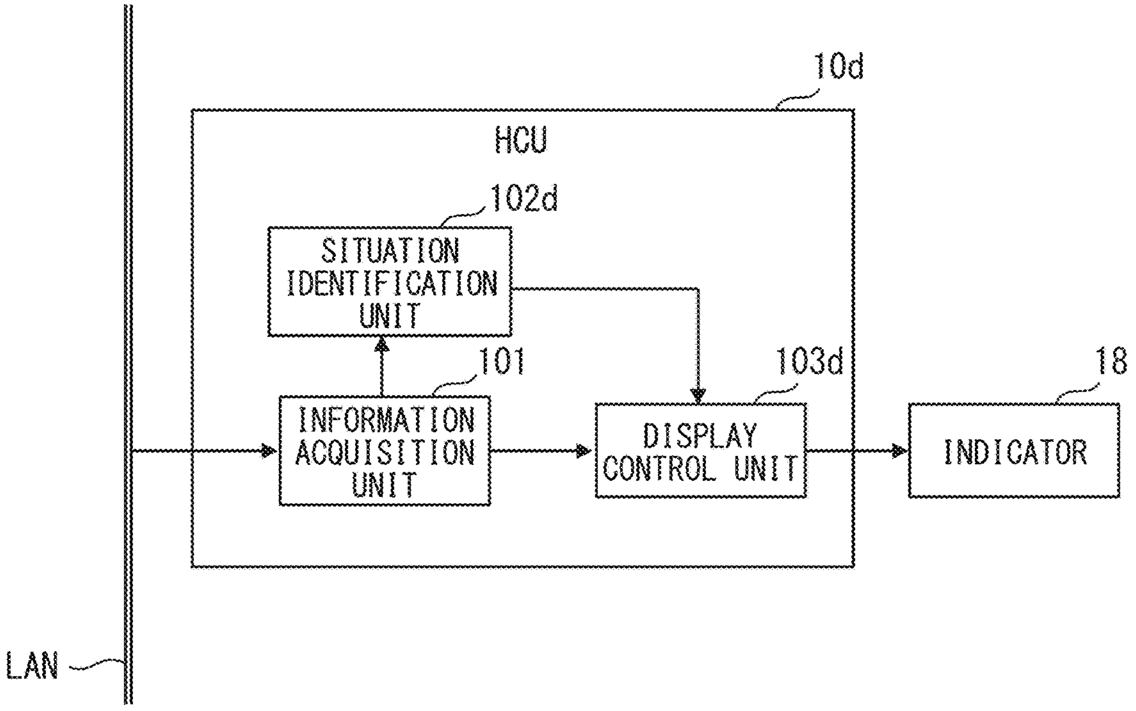
FIG. 15 is a diagram illustrating an example of a schematic configuration of an HCU.

As illustrated in FIG. 15, the HCU 10*d* includes the information acquisition unit 101, a situation identification unit 102*d*, and a display control unit 103*d* as functional blocks. The HCU 10*d* includes the situation identification unit 102*d* instead of the situation identification unit 102. The HCU 10*d* includes the display control unit 103*d* instead of the display control unit 103. The HCU 10*d* is similar to the HCU 10 of the first embodiment except for these components. The HCU 10*d* also corresponds to a vehicle display control device. In addition, execution of processing of each functional block of the HCU 10*d* by the computer corresponds to execution of the vehicle display control method.

The situation identification unit 102*d* is similar to the situation identification unit 102 of the first embodiment except that some processes are different. Hereinafter, this different point will be described. The situation identification unit 102*d* identifies the regeneration mode during use by the host vehicle as the situation of the host vehicle. The situation identification unit 102*d* may identify the regeneration mode during use by the host vehicle from the determination result by the action determination unit of the automated driving ECU 17.

The display control unit 103*d* is similar to the display control unit 103 of the first embodiment except that some processes are different. Hereinafter, this different point will be described. The display control unit 103*d* changes the display amount of the behavior related information according to the regeneration mode during use by the host vehicle identified by the situation identification unit 102*d*. There may be a case where the display amount of the required behavior related information varies depending on the regeneration mode preferred by the occupant. According to the above configuration, it is possible to display the behavior related information with the amount corresponding to the preferred regeneration mode and improve the comfort for the occupant.

It is preferable that the display control unit 103*d* makes the display amount of the information related to regenerative braking (hereinafter, regeneration related information) in the behavior related information larger as the regeneration mode having a larger magnitude of regeneration is being used. The regeneration related information may be, for example, information about the amount of power recovered by regenerative braking. The occupant who selects the regeneration mode having a larger magnitude of regeneration is more likely to have a greater interest in the application of regenerative braking of the host vehicle. According to the above configuration, the occupant having a greater interest in the application of regenerative braking of the host vehicle receives more amount of display of the regeneration related information. Therefore, it is possible to improve the comfort of the occupant.

On the other hand, the display control unit 103*d* may increase the display amount of the information corresponding to the rotation speed of the internal combustion engine or the motor for travel driving of the host vehicle in the behavior related information as the regeneration mode with a smaller magnitude of regeneration is being used. Hereinafter, information corresponding to the rotation speed of the internal combustion engine or the motor for travel driving of the host vehicle will be referred to as rotation speed information. The occupant who selects the regeneration mode with a smaller magnitude of regeneration is more likely to be interested in the traveling performance of the host vehicle. According to the above configuration, the occupant having a greater interest in the traveling performance of the host vehicle can receive more amount of display of the rotation speed information of the host vehicle. Therefore, it is possible to improve the comfort of the occupant.

Figures 16, 17:
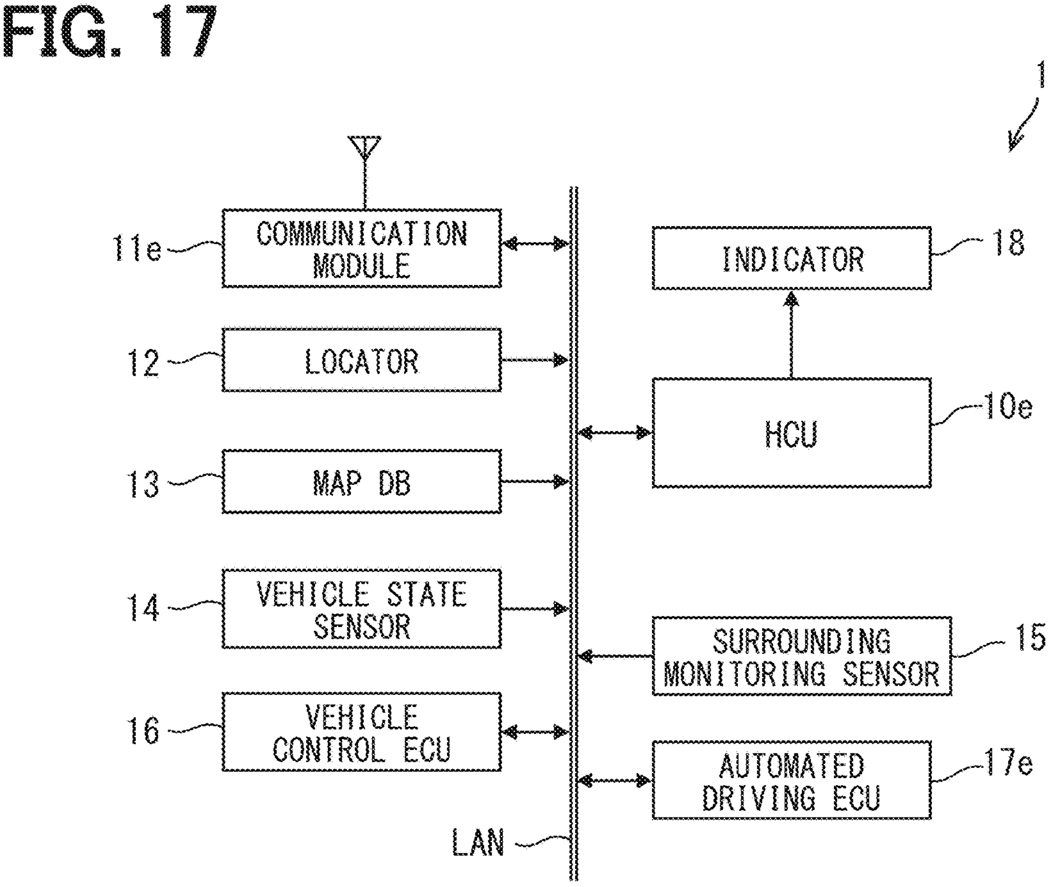
FIG. 16 is a diagram for describing an example of a display amount of behavior related information according to a regeneration mode during use by the host vehicle.
FIG. 17 is a diagram illustrating an example of a schematic configuration of a vehicle system.

An example of the display amount of the behavior related information according to the regeneration mode during use by the host vehicle will be described with reference to FIG. 16. The regeneration mode is set to three types of a strong regeneration mode, a weak regeneration mode, and a non-regeneration mode in descending order of the magnitude of regeneration. The display amount of the behavior related information is expressed in three stages of large, medium, and small for convenience. As illustrated in FIG. 16, in the case of the strong regeneration mode, the display amount of the regeneration related information is set to "large", and the display amount of the rotation speed information is set to "small". In the case of the weak regeneration mode, the display amount of the regeneration related information is "medium", and the display amount of the rotation speed information is "medium". In the case of the non-regeneration mode, the display amount of the regeneration related information is set to "small", and the display amount of the rotation speed information is set to "large". The display amount "small" may be non-display.

The display control unit 103*d* may change the degree of suppression of the reduction of the behavior related information according to the regeneration mode during use by the host vehicle identified by the situation identification unit 102*d* during the non-monitoring-obligation automated driving. The display control unit 103*d* may make the degree of suppression of the regeneration related information larger as the regeneration mode having a larger magnitude of regeneration is being used. The display control unit 103*d* may increase the degree of suppression of reduction of the tachometer information as the regeneration mode having a smaller magnitude of regeneration is being used. According to this, even in a case where the display amount of the behavior related information is reduced, it is possible to increase the behavior related information of the type according to the regeneration mode preferred by the occupant. Therefore, it is possible to improve the comfort of the occupant.

Sixth Embodiment

The present invention is not limited to the configuration of the above-described embodiment, and may have a configuration of the following sixth embodiment. Hereinafter, an example of a configuration of the sixth embodiment will be described with reference to the drawings.

A vehicle system 1*e* illustrated in FIG. 17 can be used in a vehicle (hereinafter, the remote operation vehicle) capable of performing automated driving by the remote operation. The remote operation vehicle may perform vehicle control in accordance with a remote operation command value transmitted from the remote operation center to achieve automated driving by a remote operation. In the automated driving by the remote operation, for example, the automated driving at the automation level of LV4 may be performed.

As illustrated in FIG. 17, the vehicle system 1*e* includes an HCU 10*e*, a communication module 11*e*, the locator 12, the map DB 13, the vehicle state sensor 14, the surrounding monitoring sensor 15, the vehicle control ECU 16, an automated driving ECU 17*e*, and the indicator 18. The vehicle system 1*e* includes the HCU 10*e* instead of the HCU 10. The vehicle system 1*e* includes the communication module 11*e* instead of the communication module 11. The vehicle system 1*e* includes the automated driving ECU 17*e* instead of the automated driving ECU 17. The vehicle system 1*e* is similar to the vehicle system 1 of the first embodiment except for these components.

The communication module 11*e* is similar to the communication module 11 of the first embodiment except that some processes are different. Hereinafter, this different point will be described. In a case where the remote operation command value is transmitted from the remote operation center, the communication module 11*e* receives the remote operation command value. The remote operation center is a center for performing a remote operation of the automated driving vehicle. The remote operation center transmits a remote operation command value corresponding to a driving operation input to the operation system by the remote operator. The communication module 11*e* for the remote operator to remotely operate the remote operation vehicle outside the host vehicle may receive the remote operation command value from the remote operation center by wide-area communication.

The automated driving ECU 17*e* is similar to the automated driving ECU 17 of the first embodiment except that some processes are different. Hereinafter, this different point will be described. The action determination unit of the automated driving ECU 17*e* determines a travel plan in accordance with the remote operation command value received from the remote operation center. As a result, the remote operation vehicle performs automated driving according to the remote operation command value. The automated driving ECU 17*e* may acquire the remote operation command value via the communication module 11*e*. The action determination unit of the automated driving ECU 17*e* determines whether the automated driving can be continued by the remote operation. The action determination unit may determine that the automated driving cannot be continued, for example, in a case where the communication situation with the remote operation center deteriorates. In a case where it is determined that the automated driving cannot be continued, the automated driving ECU 17*e* performs the driving-mode switching to the driving operation by the occupant of the remote operation vehicle.

Figures 18, 19:
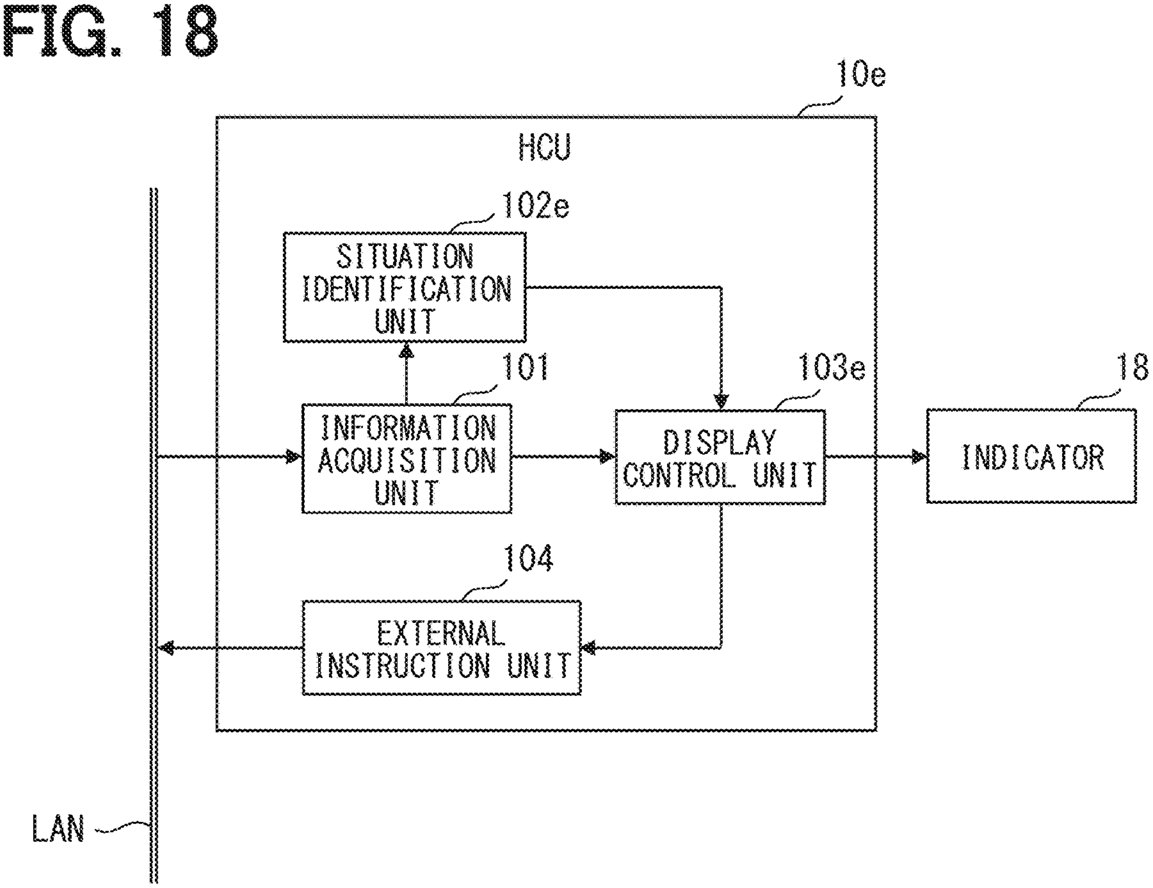
FIG. 18 is a diagram illustrating an example of a schematic configuration of an HCU.
FIG. 19 is a diagram for describing a modification of a display amount of information according to a situation of a host vehicle.

As illustrated in FIG. 18, the HCU 10*e* includes an information acquisition unit 101*e*, a situation identification unit 102*e*, and a display control unit 103*e* as functional blocks. The HCU 10*e* includes the situation identification unit 102*e* instead of the situation identification unit 102. The HCU 10*e* includes the display control unit 103*e* instead of the display control unit 103. The HCU 10*e* includes an external instruction unit 104. The HCU 10*e* is similar to the HCU 10 of the first embodiment except for these components. The HCU 10*e* also corresponds to a vehicle display control device. In addition, execution of processing of each functional block of the HCU 10*e* by the computer corresponds to execution of the vehicle display control method.

The situation identification unit 102*e* is similar to the situation identification unit 102 of the first embodiment except that some processes are different. Hereinafter, this different point will be described. The situation identification unit 102*e* identifies whether the host vehicle is remotely operated as the situation of the host vehicle. The situation identification unit 102*e* may identify whether the host vehicle is remotely operated from the determination result by the action determination unit of the automated driving ECU 17*e*. The situation identification unit 102*e* also identifies whether the host vehicle is in the situation where the occupant operation is required during the remote operation. The situation identification unit 102*e* may identify whether the host vehicle is in the situation where the occupant operation is required during the remote operation from the determination result by the action determination unit of the automated driving ECU 17*e*. The case where it is determined that the automated driving described above cannot be continued corresponds to the host vehicle being in a situation where the occupant operation is required during the remote operation.

The external instruction unit 104 instructs to display information to the remote operator. The information for the remote operator is hereinafter referred to as remote information. The remote information may be travel related information about the host vehicle. The external instruction unit 104 may transmit the remote information to the remote operation center via the communication module 11*e*. The remote information may be image data similar to the image data transmitted to the indicator 18. In the remote operation center, the remote information received from the communication module 11*e* may be displayed on a display used by the remote operator.

The display control unit 103*e* is similar to the display control unit 103 of the first embodiment except that some processes are different. Hereinafter, this different point will be described. The display control unit 103*e* reduces the behavior related information in a case where the situation of the host vehicle identified by the situation identification unit 102*e* is during the remote operation of the host vehicle, compared with in a case where the situation of the host vehicle is not during the remote operation. On the other hand, the display control unit 103*e* suppresses reduction of the behavior related information in a case where the host vehicle is in the situation where the operation by the occupant is required during the remote operation. The situation identification unit 102*e* identifies whether the host vehicle is in the situation where the occupant operation is required during the remote operation. In a case where the host vehicle is remotely operated, the occupant of the host vehicle has a lower need for the behavior related information. On the other hand, in a case where the host vehicle is in the situation where the occupant operation is required during the remote operation, the necessity of the behavior related information is higher for the occupant of the host vehicle. According to the above configuration, the display amount of the behavior related information can be changed according to the necessity of the behavior related information in the remote operation vehicle.

It is preferable that the display control unit 103*e* reduces the information to be displayed on the indicator 18 during the remote operation of the host vehicle, compared with the remote information. The remote information is information for instructing to display information to the remote operator by the external instruction unit 104. The situation identification unit 102*e* may identify whether the host vehicle is remotely operated. As an example, the behavior related information to be displayed on indicator 18 may be reduced more than the behavior related information in the remote information. For example, the behavior related information may not be reduced in the remote information. The remote operator needs more information about the host vehicle for the remote operation. On the other hand, since the occupant of the host vehicle during the remote control is not involved in the driving operation, the necessity of the information about the host vehicle is lower. According to the above configuration, it is possible to display information of an amount according to the need for the occupant of the remote operation vehicle.

A modification of the display amount of information according to the situation of the host vehicle will be described with reference to FIG. 19. In FIG. 19, a situation of the host vehicle where operation by an occupant is required during the remote operation is referred to as time of driving-mode switching. FIG. 19 illustrates the display amount of the behavior related information as an example. As illustrated in FIG. 19, during the remote control of the host vehicle, the behavior related information displayed to the occupant is reduced. The reduction may be partial omission or entire omission. On the other hand, the behavior related information displayed to the remote operator is not reduced during the remote operation of the host vehicle. As illustrated in FIG. 19, the behavior related information displayed to the occupant is not reduced at the time of the driving-mode switching. In addition, the behavior related information displayed to the remote operator may not be reduced at the time of the driving-mode switching.

Seventh Embodiment

In the above-described embodiment, as the travel related information for reduction and suppression of reduction, the behavior related information is described as an example, but the present invention is not necessarily limited thereto. For example, reduction and suppression of reduction of travel related information other than behavior related information may be performed. As an example, reduction and suppression of reduction may be performed on overlapping information other than the behavior related information.

Eighth Embodiment

In the first embodiment described above, the configuration in which the HCU 10, 10*a*, 10*b*, 10*c*, 10*d*, 10*e* performs the display control-related process is described, but the present invention is not necessarily limited thereto. For example, processing similar to the display control-related process may be performed by an electronic control device other than the HCU 10, 10*a*, 10*b*, 10*c*, 10*d*, 10*e*. In this case, the electronic control device other than the HCU 10, 10*a*, 10*b*, 10*c*, 10*d*, 10*e* corresponds to a vehicle display control device.

The present disclosure is not limited to the above-described embodiments, and various modifications can be made within the scope indicated in the claims, and embodiments obtained by appropriately combining technical means disclosed in different embodiments are also included in the technical scope of the present disclosure. The control unit and the method thereof described in the present disclosure may be realized by a dedicated computer including a processor programmed to execute one or a plurality of functions embodied by a computer program and a memory. Further, the device and the method thereof described in the present disclosure may be realized by using a dedicated hardware logic circuit. Alternatively, the device and the method thereof described in the present disclosure may be realized by one or more dedicated computers configured by a combination of a processor that executes a computer program and one or more hardware logic circuits. Furthermore, the computer program may be stored in a computer-readable non-transition tangible recording medium as an instruction executed by a computer.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicle display control device for a vehicle configured to be switched between non-monitoring-obligation automated driving that is automated driving without a surrounding monitoring obligation and monitoring-obligation driving that is driving with the surrounding monitoring obligation, the vehicle display control device comprising:
  at least one processor configured to:
    identify a situation of the vehicle;
    control display of travel related information on an indicator provided in a vehicle compartment of the vehicle, the travel related information being information related to traveling of the vehicle;
    reduce the travel related information displayed on the indicator during the non-monitoring-obligation automated driving by omitting display of a plurality of pieces of the travel related information, compared to the travel related information displayed during the monitoring-obligation driving; and
    suppress reduction of the travel related information based on a vehicle situation identified by the at least one processor during the non-monitoring-obligation automated driving, by omitting display of at least one piece of the plurality of pieces of the travel related information while displaying at least another piece of the plurality of pieces, the vehicle situation excluding information about whether the vehicle is operated in the non-monitoring-obligation automated driving.

2. The vehicle display control device according to claim 1, wherein
  the non-monitoring-obligation automated driving includes area-limited automated driving which is automated driving permitted in a limited area without the surrounding monitoring obligation, and traffic congestion limited automated driving which is automated driving permitted only in traffic congestion without the surrounding monitoring obligation,
  the vehicle is configured to be switched between the area-limited automated driving and the traffic congestion limited automated driving as the non-monitoring-obligation automated driving,
  the travel related information includes behavior related information that is information related to behavior of the vehicle itself, and
  the at least one processor is configured to suppress reduction of the behavior related information based on the vehicle situation indicating the area-limited automated driving, compared to reduction of the behavior related information displayed during the traffic congestion limited automated driving.

3. The vehicle display control device according to claim 2, wherein
  the non-monitoring-obligation automated driving includes sleep permitted automated driving in which a driver of the vehicle is permitted to sleep, and sleep non-permitted driving in which the driver is not permitted to sleep,
  the sleep non-permitted driving includes the area-limited automated driving and the traffic congestion limited automated driving,
  the vehicle is configured to be switched between the sleep permitted automated driving and the sleep non-permitted driving in the non-monitoring-obligation automated driving, and configured to be switched between the area-limited automated driving and the traffic congestion limited automated driving in the sleep non-permitted driving, and
  the at least one processor is further configured to
    reduce the behavior related information displayed on the indicator during the traffic congestion limited automated driving, compared to the behavior related information displayed during the monitoring-obligation driving, and
    based on the vehicle situation indicating the sleep permitted automated driving,
      reduce the behavior related information compared to the behavior related information displayed during the area-limited automated driving, or
      set an amount of the behavior related information to be same as an amount of the behavior related information displayed during the traffic congestion limited automated driving.

4. The vehicle display control device according to claim 2, wherein
  the at least one processor is further configured to reduce the behavior related information and increase an amount of travel environment related information displayed on the indicator during the non-monitoring-obligation automated driving compared to the monitoring-obligation driving, the travel environment related information being information related to a travel environment of the vehicle.

5. The vehicle display control device according to claim 1, wherein
  the travel related information includes behavior related information that is information related to behavior of the vehicle itself, and the at least one processor is further configured to
    reduce the behavior related information displayed on the indicator during the non-monitoring-obligation automated driving, compared to the behavior related information displayed during the monitoring-obligation driving, and
    suppress reduction of the behavior related information during the non-monitoring-obligation automated driving based on the vehicle situation indicating gripping of a steering wheel or operating of an accelerator pedal by a vehicle driver.

6. The vehicle display control device according to claim 5, wherein
  the non-monitoring-obligation automated driving includes area-limited automated driving which is automated driving permitted in a limited area without the surrounding monitoring obligation, and traffic congestion limited automated driving which is automated driving permitted only in traffic congestion without the surrounding monitoring obligation, the vehicle is configured to be switched between the area-limited automated driving and the traffic congestion limited automated driving in the non-monitoring-obligation automated driving, the at least one processor is further configured to reduce the behavior related information displayed on the indicator during the traffic congestion limited automated driving, compared to the behavior related information displayed during the monitoring-obligation driving, and suppress reduction of the behavior related information during the traffic congestion limited automated driving based on the vehicle situation indicating gripping of the steering wheel or operation of the accelerator pedal by a vehicle driver.

7. The vehicle display control device according to claim 6, wherein the at least one processor is further configured to continue to display the behavior related information, which has been increased by suppression of the reduction of the behavior related information based on the vehicle situation indicating the gripping of the steering wheel or the operation of the accelerator pedal, until at least a prescribed time elapses after a start of the suppression of the reduction of the behavior related information.

8. The vehicle display control device according to claim 6, wherein the at least one processor is further configured to terminate reduction of the behavior related information during the traffic congestion limited automated driving before resolution of the traffic congestion based on the at least one processor identifying a situation in which the traffic congestion starts to be resolved.

9. The vehicle display control device according to claim 2, wherein the behavior related information is information of a revolution speedometer of the vehicle.

10. The vehicle display control device according to claim 2, wherein the behavior related information includes information having same content as information displayed on the vehicle and redundantly indicated in a different expression or different form.

11. The vehicle display control device according to claim 1, wherein the travel related information includes behavior related information that is information related to behavior of the vehicle itself, and the at least one processor is further configured to increase the behavior related information based on the vehicle situation indicating traveling on a general road during automated driving at a specific level or higher, compared to the behavior related information displayed during driving at a level lower than the specific level, the specific level being a level at which both steering and acceleration/deceleration are assisted.

12. The vehicle display control device according to claim 11, wherein the at least one processor is further configured to further increase the behavior related information based on the vehicle situation indicating traveling at an intersection.

13. The vehicle display control device according to claim 1, wherein the travel related information includes behavior related information that is information related to behavior of the vehicle itself, and the at least one processor is further configured to control display on a fellow passenger indicator that is the indicator visually recognizable by a fellow passenger who is an occupant other than a vehicle driver, display the behavior related information on the fellow passenger indicator during automated driving at a specific level or higher, the specific level being a level at which both steering and acceleration/deceleration are assisted, and make a transition to display entertainment-related content information based on switching from the automated driving the specific level or higher to driving at a level lower than the specific level.

14. The vehicle display control device according to claim 13, wherein the at least one processor is further configured to control display on a driver indicator that is the indicator for the vehicle driver, and synchronize contents displayed on the fellow passenger indicator and the driver indicator during the automated driving at the specific level or higher.

15. The vehicle display control device according to claim 1, wherein the travel related information includes behavior related information that is information related to behavior of the vehicle itself, and the at least one processor is further configured to control display on a fellow passenger indicator that is the indicator visually recognizable by a fellow passenger who is an occupant other than a vehicle driver, control display on a driver indicator that is the indicator for the vehicle driver, and make the behavior related information displayed on the fellow passenger indicator less than the behavior related information displayed on the driver indicator during the non-monitoring-obligation automated driving.

16. The vehicle display control device according to claim 1, wherein the travel related information includes behavior related information that is information related to behavior of the vehicle itself, and the at least one processor is further configured to suppress reduction of the behavior related information based on the vehicle situation indicating traveling on a downhill during the non-monitoring-obligation automated driving.

17. The vehicle display control device according to claim 1, wherein the travel related information includes behavior related information that is information related to behavior of the vehicle itself, the vehicle is an electric vehicle having regeneration modes different in magnitude of regenerative braking, and the at least one processor is further configured to change an amount of the behavior related information displayed on the indicator depending on a current regeneration mode of the vehicle indicated by the vehicle situation.

18. The vehicle display control device according to claim 17, wherein the behavior related information includes information related to the regenerative braking, and the at least one processor is further configured to increase an amount of the information related to the regenerative braking with increase in magnitude of regenerative braking of the regeneration mode being used.

19. The vehicle display control device according to claim 1, wherein the vehicle is a remote operation vehicle operable in automated driving by a remote operation, the travel related information includes behavior related information that is information related to behavior of the vehicle itself, and the at least one processor is further configured to reduce the behavior related information based on the vehicle situation indicating the remote operation of the vehicle, compared to the behavior related information displayed during an operation that is not the remote operation, and suppress reduction of the behavior related information based on the vehicle situation indicating that the remote operation is required to be switched to an operation by an occupant of the vehicle.

20. The vehicle display control device according to claim 1, wherein the vehicle is a remote operation vehicle operable in automated driving by a remote operation, the at least one processor is further configured to:

instruct to display information to a remote operator, the remote operator being outside the vehicle to remotely operate the remote operation vehicle; and reduce information displayed on the indicator to an occupant of the vehicle, compared to information displayed to the remote operator via the at least one processor, based on the vehicle situation indicating the remote operation of the vehicle.

21. A vehicle display control method for a vehicle configured to be switched between non-monitoring-obligation automated driving that is automated driving without a surrounding monitoring obligation and monitoring-obligation driving that is driving with the surrounding monitoring obligation, the method executed by at least one processor, the method comprising:

identifying a situation of the vehicle; and controlling display of travel related information on an indicator provided in a vehicle compartment of the vehicle, the travel related information being information related to traveling of the vehicle, wherein the controlling includes reducing the travel related information displayed on the indicator during the non-monitoring-obligation automated driving by omitting display of a plurality of pieces of the travel related information, compared to the travel related information displayed during the monitoring-obligation driving, and suppressing reduction of the travel related information based on a vehicle situation identified in the identifying during the non-monitoring-obligation automated driving, by omitting display of at least one piece of the plurality of pieces of the travel related information while displaying at least another piece of the plurality of the pieces, the vehicle situation excluding information about whether the vehicle is operated in the non-monitoring-obligation automated driving.

22. A non-transitory computer readable medium storing a vehicle display control program comprising instructions configured to, when executed by at least one processor, cause the at least one processor to carry out the method according to claim 21.

* * * * *